United States Patent
Hokkyo

(10) Patent No.: US 6,638,647 B2
(45) Date of Patent: Oct. 28, 2003

(54) VERTICAL RECORDING MEDIUM WITH THIN SOFT MAGNETIC FILM

(75) Inventor: Hirotaka Hokkyo, Tokyo (JP)

(73) Assignee: NEC Corporation, Tokyo (JP)

( * ) Notice: Subject to any disclaimer, the term of this patent is extended or adjusted under 35 U.S.C. 154(b) by 105 days.

(21) Appl. No.: 09/729,709

(22) Filed: Dec. 6, 2000

(65) Prior Publication Data

US 2001/0010869 A1 Aug. 2, 2001

(30) Foreign Application Priority Data

Dec. 10, 1999 (JP) .......................... 11-352356

(51) Int. Cl.⁷ .................. G11B 5/66; G11B 5/70
(52) U.S. Cl. ................. 428/694 TM; 428/336; 428/694 TS; 428/900
(58) Field of Search ........... 428/694 TM, 694 TS, 428/900, 336

(56) References Cited

U.S. PATENT DOCUMENTS

| | | | |
|---|---|---|---|
| 5,034,286 A | * 7/1991 | Nasu et al. | 428/694 |
| 5,236,791 A | * 8/1993 | Yahisa et al. | 428/694 TP |
| 5,589,262 A | * 12/1996 | Kiuchi et al. | 428/336 |
| 5,995,309 A | * 11/1999 | Suzuki et al. | 360/55 |
| 6,387,483 B1 | * 5/2002 | Hokkyo et al. | 428/332 |

FOREIGN PATENT DOCUMENTS

| | | |
|---|---|---|
| JP | H3-183011 | 8/1991 |
| JP | 03183011 A | * 8/1991 |
| JP | 4-283413 | 10/1992 |
| JP | 6-139542 | 5/1994 |
| JP | H8-77545 | 3/1996 |
| JP | 11-149628 | 6/1999 |

OTHER PUBLICATIONS

Kazuhiro Ouchiand Shun–ichi Iwasaki, "IEEE Trans.", *Recording Performances and Preparation of Double Layer Medium for Perpendicular Magnetic Recording*, vol. 8, No. 1, pp. 17–22, (1984).

* cited by examiner

Primary Examiner—Holly Rickman
(74) Attorney, Agent, or Firm—Foley & Lardner

(57) ABSTRACT

A vertical magnetic recording medium includes a soft magnetic film formed on a substrate, and a vertical magnetization film formed on the soft magnetic film. $\mu \cdot \delta b \geq 1000$, when $\mu$ is a permeability of the soft magnetic film, and $\delta b$ [nm] is a film thickness of the soft magnetic film. The permeability $\mu$ of the soft magnetic film is $5 \leq \mu \leq 200$, and the film thickness $\delta b$ of the soft magnetic film is equal to or less than 500 nm. Also, vertical magnetic anisotropy energy Ku [erg/cc] of the vertical magnetization film is $1 \times 10^7 \leq Ku \leq 7 \times 10^8$, and coercive force Hc [kOe] of the vertical magnetization film in the vertical direction to a surface of the vertical magnetization film is $5 \leq Hc \leq 10$.

9 Claims, 3 Drawing Sheets

VERTICAL RECORDING MEDIUM WITH THIN SOFT MAGNETIC FILM

BACKGROUND OF THE INVENTION

1. Field of the Invention

The present invention relates to a vertical magnetic recording medium suitable for a magnetic disk.

2. Description of the Related Art

In recent years, a much larger capacity and a much smaller size have been required for had disk drives, as information devices such as personal computers and work stations have progressed. In magnetic disks, much higher density is also required.

However, in a longitudinal magnetic recording method which has been being widely used, problems arise in that miniaturization of recording bits incurs heat fluctuation in recording magnetization and that a higher coercive force which may exceed the recording ability of a recording head is required, when realizing a high recording density. Hence, a vertical magnetic recording method has been discussed as a magnetic recording method capable of greatly improving the recording density while solving the problems described above. As a kind of vertical magnetic recording medium which realizes this method, there is a vertical magnetic recording medium having a two-layer structure which is composed of a soft magnetic film with a high magnetic permeability and a vertical magnetization film with a high vertical anisotropy.

FIG. 1 is a schematic cross sectional view showing an example of a conventional vertical magnetic recording medium. The vertical magnetic recording medium 21 is composed of a lower soft magnetic film 23 and a vertical magnetization film 24 which are laminated in an order on a substrate 22 made of non-magnetic material. For example, a NiFe film is used as the lower soft magnetic film 23, and CoCr-based alloy is used for the vertical magnetization film 24 (Nippon-Ouyou-Jiki-Gakkai-Shi, Vol. 8, No. 1, 1984, pp. 17–22).

This vertical magnetic recording medium 21 achieves recording more easily than a conventional longitudinal magnetic recording method because of existence of the lower soft magnetic film 23. That is, this vertical magnetic recording medium 21 can easily perform recording since it has much greater vertical magnetic anisotropic energy than the magnetic anisotropic energy of a conventional longitudinal magnetic recording medium in the longitudinal direction and also has much greater coercive force in the direction vertical to the film surface than a conventional longitudinal magnetic recording medium. Therefore, the vertical magnetic recording medium 21 can be stronger against heat fluctuation than a medium according to the longitudinal magnetic recording method. To deal with the problem of the heat fluctuation, it tends to use a film having high vertical magnetic anisotropic energy and coercive force in the direction vertical to the film surface greater than those of a CoCr-based film which has been the main trend of vertical magnetic films.

Meanwhile, in the conventional vertical magnetic recording medium using a vertical magnetization film which has great vertical magnetic anisotropic energy and large coercive force in the direction vertical to the film surface, the magnetic permeability $\mu$ and film thickness $\delta_b$ of the lower soft magnetic film must be set to greater values in order to maintain a recording sensitivity, than in the case of using a conventional vertical magnetization film.

Where a practical medium manufacturing process is considered, the lower soft magnetic film should be thinner as much as possible. This is because a manufacturing process of the vertical magnetization film formed on the lower soft magnetic film becomes easier. The vertical magnetization film determines the recording/reproducing ability at a high recording density, when the lower soft magnetic film is thinned.

In conjunction with the above description, a vertical magnetic recording medium is disclosed in Japanese Laid Open Patent Application (JP-A-Heisei 4-283413). In this reference, a lower soft magnetic lining layer (12) and a vertical magnetization film (13) are formed in order on a non-magnetic material substrate (11). After a magnetic polar surface layer of the lower soft magnetic layer (12) is removed by an ion etching method or an inverse sputtering method, the vertical magnetization film (13) is formed thereon. The coercive force of the vertical magnetization film (13) becomes gradually smaller into a direction of the phase boundary with the lower soft magnetic layer (12) from the surface of the vertical magnetization film (13). Also, the saturation magnetization becomes gradually larger into a direction of the phase boundary with the lower soft magnetic layer (12) from the surface of the vertical magnetization film (13).

Also, a vertical magnetic recording medium is disclosed in Japanese Laid Open Patent Application (JP-A-Heisei 6-139542). In this reference, a lower soft magnetic layer (12) and a vertical magnetization film (13) are formed in order on a non-magnetic material substrate (11). The lower soft magnetic layer (12) has the relative permeability in a range of 20 to 1000 and the saturation magnetic flux density of 10 kG or more.

Also, a vertical magnetic recording medium is disclosed in Japanese Laid Open Patent Application (JP-A-Heisei 11-149628). In this reference, the vertical magnetic recording medium (20) is composed of a substrate (22), a lower soft magnetic film (24) formed on the substrate (22), and a vertical magnetization film 28 formed on the lower soft magnetic film (24). The lower soft magnetic film (24) is provided not to have a non-magnetic wall structure. The coercive force of the lower soft magnetic film (24) is equal to or less than 300 Oe.

SUMMARY OF THE INVENTION

An object of the present invention is to provide a vertical magnetic recording medium which can comply with thinning of the lower soft magnetic film.

Another object of the present invention is to provide a vertical magnetic recording medium which has large vertical magnetic anisotropic energy and large coercive force in the direction vertical to the film surface.

Still another object of the present invention is to provide a vertical magnetic recording medium which can eliminate the problem of heat fluctuation.

In order to achieve an aspect of the present invention, a vertical magnetic recording medium includes a soft magnetic film formed on a substrate, and a vertical magnetization film formed on the soft magnetic film, $\mu \cdot \delta b \geq 1000$, when $\mu$ is a permeability of the soft magnetic film, and $\delta b$ [nm] is a film thickness of the soft magnetic film.

Here, it is desirable that the permeability $\mu$ of the soft magnetic film is $5 \leq \mu \leq 200$. Also, it is desirable that the film thickness $\delta b$ of the soft magnetic film is equal to or less than 500 nm.

Also, it is desirable that vertical magnetic anisotropy energy Ku [erg/cc] of the vertical magnetization film is $1 \times 10^7 \leq Ku \leq 7 \times 10^8$. Also, it is desirable that coercive force Hc [kOe] of the vertical magnetization film in the vertical direction to a surface of the vertical magnetization film is $5 \leq Hc \leq 10$.

Also, the vertical magnetization film may include FePt alloy. In this case, it is desirable that the vertical magnetization film comprises x at %Fe-(100-x) at %Pt alloy, where $40 \leq x \leq 60$. It is more desirable that the vertical magnetization film comprises 50at %Fe-50at %Pt alloy, where x=50 at %.

Also, the vertical magnetization film may include RCo alloy, where R is one or more selected from the group consisting of Y, Ce, Sm, La and Pr. In this case, the vertical magnetization film may include $RCo_5$ alloy, where R is one or more selected from the group consisting of Y, Ce and Sm. Alternatively, the vertical magnetization film may include $R_2Co_{17}$ alloy, where R is one or more selected from the group consisting of Y, Ce, Sm, La and Pr.

Also, the soft magnetic film may include FeSiAl alloy. In this case, it is desirable that the vertical magnetization film comprises 84.9wt %Fe-xwt %Si-(15.1-x)wt %Al alloy, where $8.0 \leq x \leq 12.0$. It is more desirable that the vertical magnetization film may include 84.9wt %Fe-9.6wt %Si-5.5wt %Al.

Also, the soft magnetic film may include CoNiFe alloy. Especially, it is desirable that the soft magnetic film may include 62at %Co-12at %Ni-26at %Fe alloy.

In order to achieve another aspect of the present invention, a vertical magnetic recording medium includes a soft magnetic film formed on a substrate, and a vertical magnetization film formed on the soft magnetic film, and $\mu \cdot \delta b \geq 1000$ when $\mu$ is a permeability of the soft magnetic film, and $\delta b$ [nm] is a film thickness of the soft magnetic film. In addition, the permeability $\mu$ of the soft magnetic film is $5 \leq \mu \leq 200$, and the film thickness $\delta b$ of the soft magnetic film is equal to or less than 500 nm.

Here, it is desirable that the vertical magnetization film may include FePt alloy or RCo alloy, where R is one or more selected from the group consisting of Y, Ce, Sm, La and Pr.

Also, it is desirable that the soft magnetic film may include FeSiAl alloy or CoNiFe alloy.

Also, it is desirable that vertical magnetic anisotropy energy Ku [erg/cc] of the vertical magnetization film is $1 \times 10^7 \leq Ku \leq 7 \times 10^8$, and coercive force Hc [kOe] of the vertical magnetization film in the vertical direction to a surface of the vertical magnetization film is $5 \leq Hc \leq 10$.

DESCRIPTION OF THE PREFERRED EMBODIMENTS

Hereinafter, a vertical magnetic recording medium according to the present invention will now be described below in detail with reference to the attached drawings.

Figure 1:
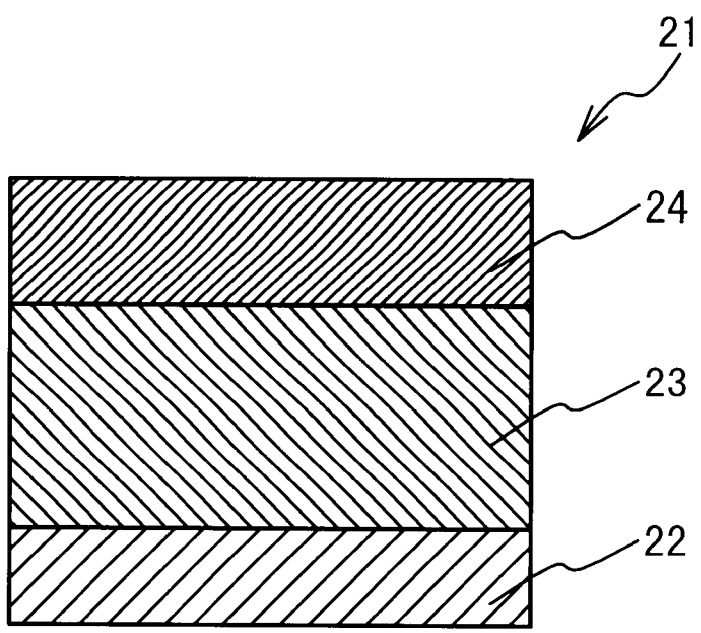
FIG. 1 is a schematic cross sectional view showing an example of a conventional vertical magnetic recording medium.
Figure 2:
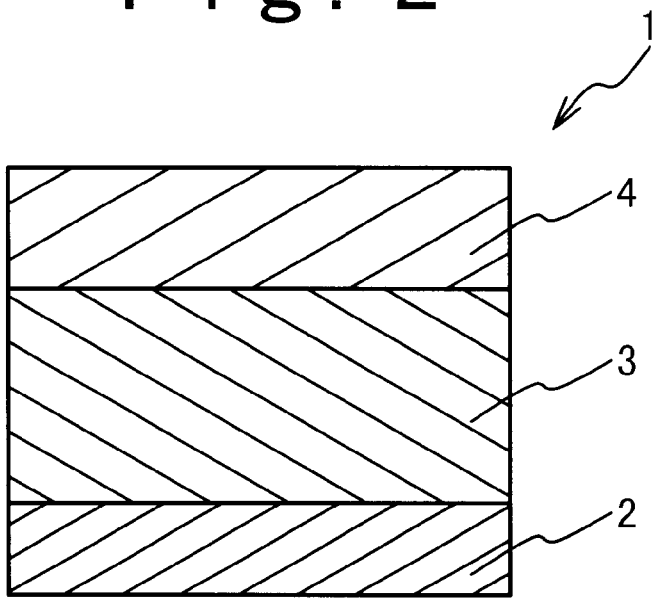
FIG. 2 is a cross sectional view showing a vertical magnetic recording medium according to the present invention.

FIG. 2 is a cross sectional view showing a vertical magnetic recording medium according to the present invention. The vertical magnetic recording medium 1 is composed of a lower soft magnetic film 3 with a magnetic permeability $\mu$ and a film thickness $\delta_b$, and a vertical magnetization film 4 which are laminated on a substrate 2 made of non-magnetic material.

It is preferable that the magnetic permeability $\mu$ of the lower soft magnetic film 3 satisfies $5 \leq \mu \leq 200$, and the film thickness $\delta_b$ thereof is 500 nm or less. For example, alloys such as FeSiAl alloy and CoNiFe alloy are used for the lower soft magnetic film 3. It is preferable that as the FeSiAl alloy is used is 84.9wt %Fe-Xwt %Si-(15.1-X)wt %Al alloy (hereinafter, to be referred to as $Fe_{84.9}$-$Si_X$—$Al_{15.1-X}$ alloy) where $8.0 \leq X \leq 12.0$ is satisfied, for example. More preferably, the composition of the FeSiAl alloy is 84.9wt %Fe-9.6wt %Si-5.4wt %Al. Also, it is preferable that 62at %Co-12at %Ni-26at %Fe is used as the CoNiFe alloy, for example.

It is preferable that the vertical magnetization film 4 has the vertical magnetic anisotropic energy Ku [erg/cc] in a range of $1 \times 10^7 \leq Ku \leq 7 \times 10^8$, and the coercive force Hc [kOe] in the direction vertical to its film surface in a range of $5 \leq Hc \leq 10$. For example, FePt alloy or RCo alloy (where R is one or more selected from the group consisting of Y, Ce, Sm, La, and Pr) is used for the vertical magnetization film 4. It is preferable that as the FePt alloy is used X at %Fe-(100-X)at %Pt alloy (hereinafter, to be referred to as $Fe_X$-$Pt_{100-x}$) where $40 \leq X \leq 60$ is satisfied, for example. It is more preferable that composition of the FePt alloy is 50at %Fe-50at %Pt. Also, it is preferable that as the Rco alloy is $Rco_5$ alloy (where R is one or more selected from the group consisting of Y, Ce, and Sm), $R_2Co_{17}$ alloy (where R is one or more selected from the group consisting of Y, Ce, Sm, La, and Pr). In the vertical magnetic recording medium 1, a condition of $\mu \cdot \delta_b \geq 1000$ is satisfied where the magnetic permeability of the lower soft magnetic film 3 is $\mu$ and the thickness thereof is $\delta_b$ [nm]. Therefore, sufficient reproduction sensitivity can be maintained even if the lower soft magnetic film 3 is thinned.

Figure 3:
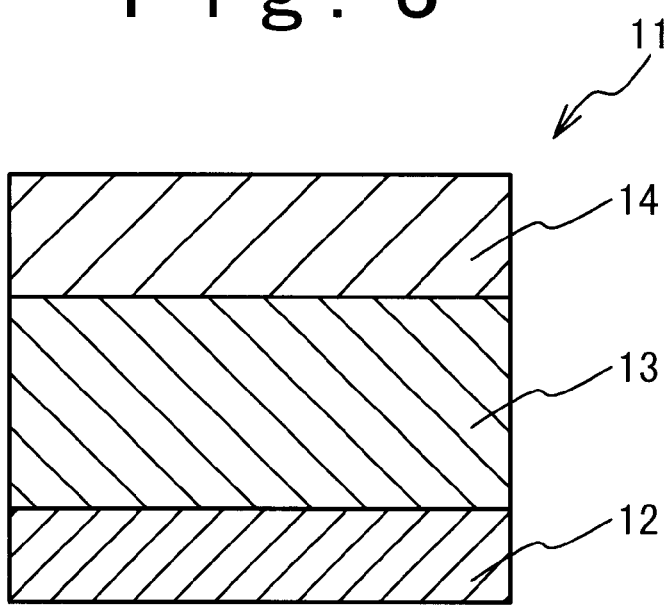
FIG. 3 is a cross sectional view showing a specific example of the vertical magnetic recording medium according to the present invention.

FIG. 3 is a cross sectional view showing a specific example of a vertical magnetic recording medium according to the first embodiment. The vertical magnetic recording medium 11 is composed of a 84.9wt %Fe-9.6wt %Si-5.5wt %Al film 13 (hereinafter to be referred to as a $Fe_{84.9}Si_{9.6}Al_{5.5}$ film 13) as a lower soft magnetic film with a magnetic permeability $\mu$ and a film thickness $\delta_b$, and a 50at %Fe-50at %Pt film 14 (hereinafter to be referred to as a $Fe_{50}Pt_{50}$ film 14) as a vertical magnetization film 4, which are laminated on a substrate 2 made of non-magnetic material.

Next, a vertical magnetic recording medium according to the present invention will be described more specifically.

The First Embodiment

Samples were formed to have $Fe_{84.9}Si_{9.6}Al_{5.5}$ films 13 which were formed on substrates 12 of a 2.5-inch size at the substrate temperature of 400° C. by a sputtering method by use of 84.9wt %Fe-9.6wt %Si-5.5wt %Al targets of a 6-inch size. The samples had ten different thicknesses of 2, 5, 10, 20, 50, 100, 200, 250, 500, and 750 nm. The film forming condition was set in such a manner that the supplied electric power was 0.5 kw, the argon gas pressure was 4 mTorr ($5.31 \times 10^{-1}$ Pa), and the film forming rate was 3 nm/sec at the initial vacuum degree of $5 \times 10^{-7}$ mTorr ($6.65 \times 10^{-8}$ Pa) to 7 mTorr ($9.31 \times 10^{-1}$ Pa).

The ten types of samples were heated with a lamp in a sputter chamber. The heating time was changed so as to prepare the ten samples with $Fe_{84.9}Si_{9.6}Al_{5.5}$ films 13 having different magnetic permeabilities $\mu$. The magnetic permeabilities $\mu$ were changed in a range of seven types of 2, 5, 10, 20, 50, 100, and 200. In other words, mediums respectively having seven types of magnetic permeabilities $\mu$ were prepared for each of ten types of different film thicknesses $\delta_b$. Thus, total seventy different types mediums with $Fe_{84.9}Si_{9.6}Al_{5.5}$ films 13 were prepared. The mediums with the $Fe_{84.9}Si_{9.6}Al_{5.5}$ films 13 having combinations of a permeability $\mu$ and a film thickness $\delta_b$ [nm] that satisfy $\mu \cdot \delta_b = 1000$, e.g., $(\mu, \delta b)=(5, 200)$, $(10, 100)$, $(20, 50)$, $(50, 20)$, $(100, 10)$, and $(200, 5)$ were respectively named vertical magnetic recording mediums A1 to A6 in the first embodiment.

Also, $Fe_{50}Pt_{50}$ films 14 were respectively formed on $Fe_{84.9}Si_{9.6}Al_{5.5}$ films 13 by 50 nm at the substrate temperature of 450° C. by use of a target of 50at %Fe-50at %Pt, for the purpose of measurement of magnetic permeabilities. Further, a C protection film was formed by 5 nm on each of the $Fe_{50}Pt_{50}$ films 14.

Also, as comparison examples, mediums with $Fe_{84.9}Si_{9.6}Al_{5.5}$ films 13 having combinations of a permeability $\mu$ and a film thickness $\delta_b$ [nm] that satisfy $\mu \cdot \delta_b = 500$, e.g., $(\mu, \delta_b)=(5, 100)$, $(10, 50)$, $(50, 10)$, and $(100, 5)$ were respectively named comparative mediums AA1 to AA4. In addition, a medium with $Fe_{84.9}Si_{9.6}Al_{5.5}$ films 13 having combinations of a permeability $\mu$ and a film thickness $\delta_b$ [nm] that satisfy $\mu \cdot \delta_b = 400$, e.g., $(\mu, \delta_b)=(20, 20)$ was named a comparison medium AA5. Further, mediums with $Fe_{84.9}Si_{9.6}Al_{5.5}$ films 13 having combinations of permeabilities $\mu=2$ to 200 and a film thickness $\delta b = 750$ nm were respectively named comparison mediums AA6 to AA12.

Further, samples were formed on substrates of a 12-inch size at the substrate temperature of 400° C. by a sputtering method by use of 21.5wt %Ni-78.5wt %Fe target of a 6-inch size, to have five different thicknesses of 5, 10, 50, 100, and 200 nm. The film forming condition was set in such a manner that the supplied electric power was 0.5 KW, the argon gas pressure was 4 mTorr ($5.31 \times 10^{-1}$ Pa), and the film forming speed was 3 nm/sec, at the initial vacuum degree of $5 \times 10^{-7}$ mTorr ($6.65 \times 10^{-8}$ Pa) to 7 mTorr ($9.31 \times 10^{-1}$ Pa). The samples with the $Ni_{21.5}Fe_{78.5}$ films having different film thicknesses were heated with a lamp in a sputter chamber. The heating time was changed so as to prepare $Ni_{21.5}Fe_{78.5}$ films having different magnetic permeabilities $\mu$. The magnetic permeabilities $\mu$ were changed in a range of seven kinds of 2, 5, 10, 20, 50, 100, and 200. In other words, mediums with the $Ni_{21.5}Fe_{78.5}$ films respectively having seven magnetic permeabilities $\mu$ were prepared for every one of five different film thicknesses $\delta_b$. Thus, total thirty-five different kinds of samples with $Ni_{21.5}Fe_{78.5}$ films were prepared.

Samples with $Fe_{50}Pt_{50}$ films were respectively formed on the $Ni_{21.5}Fe_{78.5}$ films by 50 nm by use of 50at %Fe-50at %Pt targets for the purpose of measurement of magnetic permeability. Further, a C protection film was formed by 5 nm on each of the samples. At this time, mediums with the $Ni_{21.5}Fe_{78.5}$ films having combinations of a permeability $\mu$ and a film thickness $\delta_b$ [nm] that satisfy $\mu \cdot \delta_b = 2000$, e.g., $(\mu, \delta_b)=(10, 200)$, $(20, 100)$, $(100, 20)$, and $(200, 10)$ were respectively named conventional mediums AB1 to AB4. In addition, mediums with the $Ni_{21.5}Fe_{78.5}$ films having combinations of a permeability $\mu$ and a film thickness $\delta_b$ [nm] that satisfy $\mu \cdot \delta_b = 1000$, e.g., $(\mu, \delta b)=(5, 200)$, $(10, 100)$, $(20, 50)$, $(50, 20)$, $(100, 10)$, and $(200, 5)$ were respectively named conventional comparison mediums AC1 to AC6. It should be noted that the $Ni_{21.5}Fe_{78.5}$ film was generally used for a lower soft magnetic film conventionally.

Then, the vertical magnetic anisotropic energy Ku of each $Fe_{50}Pt_{50}$ film was measured by a magnetic torque meter to find $Ku = 7 \times 10^7$ [erg/cc]. In addition, the coercive force in the direction vertical to the film surface was measured by a Kerr rotation angle measurement device to find $Hc = 5.5$ [kOe].

Recording/reproducing tests were carried out to total seventy kinds of vertical magnetic recording mediums having seven kinds of permeabilities for each of ten different film thicknesses of $Fe_{84.9}Si_{9.6}Al_{5.5}$ films 13, by use of a monopolar head and a MR head respectively used as a recording head and a reproducing head. The MR head had a reproduction track width of 1 $\mu$m and a reproduction gap length of 0.1 $\mu$m. The monopolar head has a track width of 1.5 $\mu$m. Evaluations were carried out under the condition that the recording current was 10 mAop, the sense current was 12 mA, the circumferential speed was 12.7 m/s, and the floating amount was 45 nm. A signal having a recording density of 300 kFRPI was recorded, and thereafter, a reproduced output thereof was measured.

Table 1 shows reproduced outputs ($\mu$V) of the seventy kinds of samples with $Fe_{84.9}Si_{9.6}Al_{5.5}$ films 13. This table shows the mediums according to the first embodiment and the mediums of comparison examples clearly separated.

TABLE 1

Reproduced output

| | $\mu$ | | | | | | |
|---|---|---|---|---|---|---|---|
| $\delta$ b | 2 | 5 | 10 | 20 | 50 | 100 | 200 |
| 2 nm | 142 | 152 | 165 | 174 | 187 | 195 | 210 |
| 5 nm | 146 | 163 | 176 | 186 | 192 | 206 | 415 |
| 10 nm | 152 | 174 | 188 | 204 | 231 | 403 | 435 |
| 20 nm | 147 | 186 | 192 | 210 | 462 | 412 | 439 |
| 50 nm | 154 | 198 | 242 | 470 | 438 | 429 | 442 |
| 100 nm | 189 | 251 | 481 | 459 | 446 | 438 | 448 |
| 200 nm | 205 | 485 | 482 | 472 | 481 | 435 | 446 |
| 250 nm | 221 | 469 | 476 | 465 | 495 | 520 | 501 |
| 500 nm | 253 | 472 | 463 | 492 | 497 | 509 | 509 |
| 750 nm | 245 | 265 | 322 | 312 | 296 | 315 | 320 |

Unit: $\mu$ V

*values of comparison mediums in solid line block
*values of mediums in the first embodiment in dotted line block As can be seen from the table 1, the reproduced outputs were sufficiently secured in the region lower than the mediums A1 to A6 in the first embodiment, (i.e., in the region of the present embodiment). On the other hand, reproduced outputs can be greatly lowered in the region upper than the comparison mediums AA6 to AA12, (i.e., in the region of the conventional samples).

Figure 4:
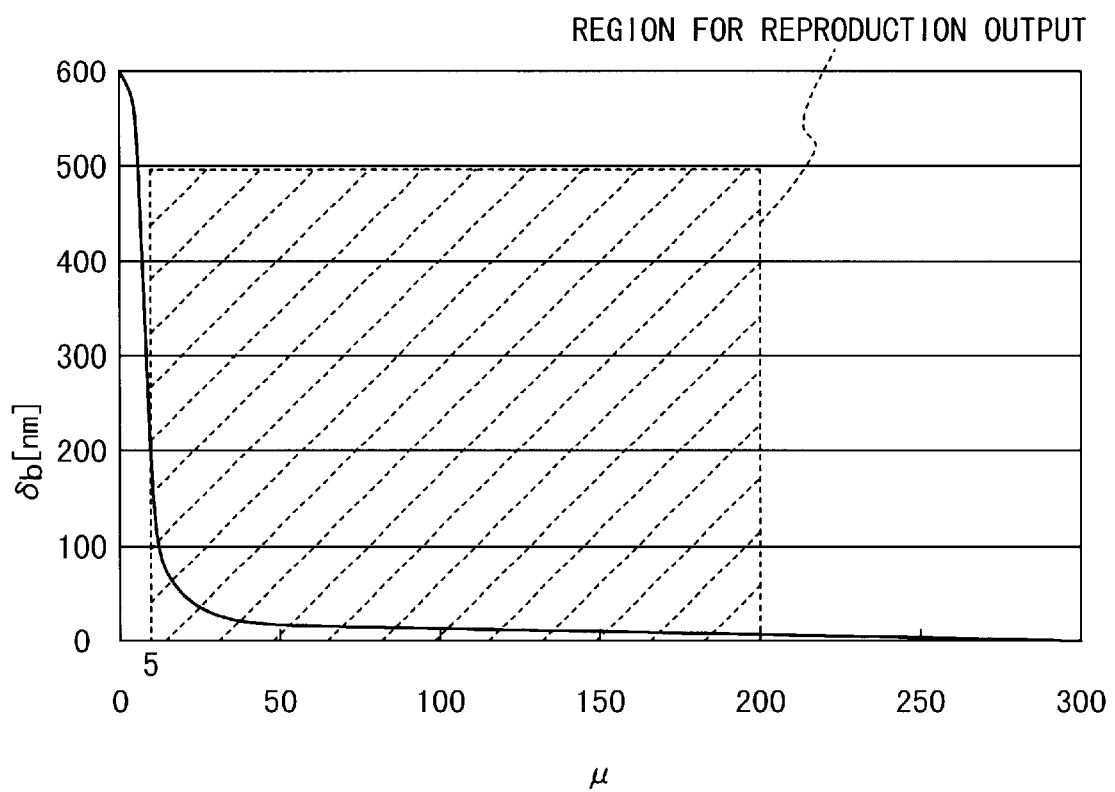
FIG. 4 shows a relation of magnetic permeability $\mu$ of the lower soft magnetic film and the film thickness $\delta_b$ thereof in a region where reproduce output is secured.

FIG. 4 shows the results obtained above in a different manner, where the horizontal axis expresses the magnetic permeability $\mu$ of the lower soft magnetic film and the vertical axis expresses the film thickness $\delta_b$ thereof. As seen from this FIG. 4, sufficient reproduced outputs can be secured where $\mu \cdot \delta_b \geq 1000$ was satisfied.

In case where the magnetic permeability $\mu$ of the lower soft magnetic film is 2, sufficient reproduced outputs cannot be secured with respect to any of the film thicknesses $\delta_b$.

Also, in case where the film thickness $\delta_b$ is 2 nm, sufficient reproduced outputs cannot be secured with respect to any of the permeabilities $\mu$. This is because the permeability $\mu$ and film thickness $\delta_b$ of the lower soft magnetic film are lower than required. Further, the reproduced output tends to decrease even when the film thickness $\delta_b$ of the lower soft magnetic film exceeds 500 nm. This is because the surface smoothness of the lower soft magnetic film was disturbed since the film thickness $\delta_b$ of the lower soft magnetic film is thicker than required. Consequently, the vertical orientation of the vertical magnetization film formed on the lower soft magnetic film is deteriorated. Hence, it is found that all values of ($\mu$, $\delta_b$) that satisfy the relationship of $\mu \cdot \delta_b \geq 1000$ cannot be always used for practical design, even if the relationship of $\mu \cdot \delta_b \leq 1000$ is satisfied. It is necessary to satisfy the relationship of $\mu \cdot \delta_b \geq 1000$ and simultaneously to satisfy a relationship of $5 \leq \mu \leq 200$ and a relationship that $\delta_b$ is 500 nm or less.

Similarly, a signal having a recording density of 300 kFRPI was recorded on the conventional mediums AB1 to AB4 and the conventional comparison mediums AC1 to AC6. Reproduced outputs were thereafter measured with a MR head. The measurement values were shown in Table 2.

TABLE 2

Reproduced output

| Conventional Medium AB1 | Conventional Medium AB2 | Conventional Medium AB3 | Conventional Medium AB4 |
|---|---|---|---|
| 460 | 522 | 516 | 503 |

| Conventional comparison medium AC1 | Conventional comparison medium AC2 | Conventional comparison medium AC3 | Conventional comparison medium AC4 | Conventional comparison medium AC5 | Conventional comparison medium AC6 |
|---|---|---|---|---|---|
| 192 | 142 | 152 | 165 | 174 | 187 |

Unit: µV

As can be seen from the Table 2, the value of $\mu \cdot \delta_b = 1000$ is insufficient to obtain securely a recording/reproducing sensitivity and the value of $\mu \cdot \delta_b$ requires at least $\mu \cdot \delta_b = 2000$ or more, in case of a vertical magnetic recording medium which uses a $Ni_{21.5}Fe_{78.5}$ film as the lower soft magnetic film. From the above, a vertical magnetic recording medium having a $Fe_{84.9}Si_{9.6}Al_{5.5}$ film as its lower soft magnetic film can obtain more securely a recording/reproducing sensitivity than a vertical magnetic recording medium having a $Ni_{21.5}Fe_{78.5}$ film as its lower soft magnetic film, even if the value of $\mu \cdot \delta_b$ is smaller. As a result of this, the lower soft magnetic film can be designed to be thinner. This is because the $Fe_{84.9}Si_{9.6}Al_{5.5}$ film has smaller anisotropy and is more isotropic than the $Ni_{21.5}Fe_{78.5}$ film. Therefore, the $Fe_{84.9}Si_{9.6}Al_{5.5}$ film has a higher sensitivity to the magnetic field generated by the recording head, so that the recording/reproducing sensitivity is improved as a result.

From the above, if a $Fe_{84.9}Si_{9.6}Al_{5.5}$ film is used in place of a $Ni_{21.5}Fe_{78.5}$ film for a vertical magnetic recording medium, design can be made with a lower value of $\mu \cdot \delta_b$. If the relationship of $\mu \cdot \delta_b \geq 1000$ is satisfied and if relationships of $5 \leq \mu \leq 200$ and $\delta_b \leq 500$ nm are satisfied simultaneously where the magnetic permeability of the $Fe_{84.9}Si_{9.6}Al_{5.5}$ film is $\mu$ and the film thickness thereof is $\mu_b$, the recording/reproducing sensitivity can be sufficiently obtained even in case where the vertical magnetic anisotropic energy Ku and the coercive force Hc in the direction vertical to the film surface are much greater than those of conventional vertical magnetization films, as in the first embodiment. As a result, by using a $Fe_{84.9}Si_{9.6}Al_{5.5}$ film as a lower soft magnetic film and by satisfying the conditions of $\mu \cdot \delta_b \geq 1000$, $5 \leq \mu \leq 200$, and $\delta_b \leq 500$ nm, the lower soft magnetic film can be more thinned than the case of using a $Ni_{21.5}Fe_{78.5}$ film which is often used conventionally as a lower soft magnetic film, even if where the vertical magnetic anisotropic energy Ku and the coercive force Hc in the direction vertical to the film surface are much greater than those of conventional CoCr-based vertical magnetization films (e.g., Ku is about $5 \times 10^6$ [erg/cc] and Hc is about 3 [kOe]), as in the case of the material used in the first embodiment.

The Second Embodiment

Like the first embodiment, total seventy different kinds of samples with $Fe84.9Si_{9.6}Al_{5.5}$ films were prepared by use of 84.9wt %Fe-9.6wt %Si-5.5wt %Al targets, i.e., $Fe_{84.9}Si_{9.6}Al_{5.5}$ films respectively having seven different magnetic permeabilities $\mu$ were prepared for every one of ten different film thicknesses $\delta_b$. Also, like the first embodiment, mediums were prepared by use of 40at %Fe-60at %Pt targets in place of the 50at %Fe-50at %Pt targets in the first embodiment, on $Fe_{84.9}Si_{9.6}Al_{5.5}$ films formed separately from those formed for the purpose of measurement of magnetic permeability.

At this time, like the first embodiment, mediums with $Fe_{84.9}Si_{9.6}Al_{5.5}$ films having combinations of a permeability $\mu$ and a film thickness $\delta_b$ [nm] that satisfy $\mu \cdot \delta_b = 1000$, e.g., ($\mu$, $\delta_b$)=(5, 200), (10, 100), (20, 50), (50, 20), (100, 10), and (200, 5) were respectively named vertical magnetic recording mediums B1 to B6 according to the second embodiment. In addition, mediums with $Fe_{84.9}Si_{9.6}Al_{5.5}$ films having combinations of a permeability $\mu$ and a film thickness $\delta_b$ [nm] that satisfy $\mu \cdot \delta_b = 500$, e.g., ($\mu$, $\delta_b$)=(5, 100), (10, 50), (50, 10), and (100, 5) were respectively named comparison mediums BB1 to BB4. Also, a medium having $Fe_{84.9}Si_{9.6}Al_{5.5}$ films having combinations of a permeability $\mu$ and a film thickness $\delta_b$ [nm] that satisfies $\mu \cdot \delta_b = 400$, e.g., ($\mu$, $\delta_b$)=(20, 20) was named a comparison medium BB5. Further, mediums with $Fe_{84.9}Si_{9.6}Al_{5.5}$ films each having permeabilities $\mu$=2 to 200 and a film thickness $\delta_b$=750 nm were respectively named comparison mediums BB6 to BB12.

Also, in the second embodiment, like the first embodiment, conventional mediums AB1 to AB4 as vertical two-layer mediums having $Ni_{21.5}Fe_{78.5}$ films as the lower soft magnetic film were formed to have a permeability $\mu$ and a film thickness $\delta_b$ [nm] that satisfy $\mu \cdot \delta b = 2000$, e.g., ($\mu$, $\delta_b$)=(10, 200), (20, 100), (100, 20), and (200, 10). Also, conventional comparison mediums AC1 to AC6 having $Ni_{21.5}Fe_{78.5}$ films as the lower soft magnetic film were formed to have a permeability $\mu$ and a film thickness $\delta_b$ [nm] that satisfy $\mu \cdot \delta_b = 1000$, e.g., ($\mu$, $\delta_b$)=(5, 200), (10, 100), (20, 50), (50, 20), (100, 10), and (200, 5).

Then, the vertical magnetic anisotropic energy Ku of each $Fe_{40}Pt_{60}$ film was measured by a magnetic torque meter to find Ku=$1 \times 10^8$ [erg/cc]. In addition, the coercive force in the direction vertical to the film surface was measured by a Kerr rotation angle measurement device to find Hc=7.0 [kOe].

Recording/reproducing tests were carried out to total seventy kinds of vertical magnetic recording mediums having seven different permeabilities for every one of ten different film thicknesses of lower soft magnetic films, under the same conditions as those of the first embodiment.

Specifically, a signal having a recording density of 300 kFRPI was recorded, and thereafter, a reproduced output thereof was measured. Table 3 shows the values of reproduced outputs. This table 3 also shows which values belong to which of the mediums according to the second embodiment and the comparison mediums.

TABLE 3 reproduced output

| $\delta b$ | $\mu$ | | | | | | |
|---|---|---|---|---|---|---|---|
| | 2 | 5 | 10 | 20 | 50 | 100 | 200 |
| 2 nm | 131 | 142 | 165 | 181 | 190 | 195 | 205 |
| 5 nm | 146 | 163 | 164 | 172 | 196 | 199 | 422 |
| 10 nm | 159 | 176 | 190 | 216 | 225 | 403 | 430 |
| 20 nm | 143 | 190 | 192 | 212 | 471 | 423 | 441 |
| 50 nm | 152 | 203 | 235 | 465 | 429 | 429 | 442 |
| 100 nm | 170 | 256 | 495 | 464 | 443 | 442 | 439 |
| 200 nm | 210 | 493 | 482 | 472 | 476 | 442 | 448 |
| 250 nm | 228 | 478 | 485 | 471 | 502 | 519 | 497 |
| 500 nm | 259 | 477 | 463 | 491 | 509 | 527 | 513 |
| 750 nm | 241 | 262 | 328 | 313 | 297 | 324 | 335 |

Unit: μ V

*values of comparison mediums in solid line block
*values of mediums in the second embodiment in dotted line block As can be seen from the table 3, the reproduced outputs are sufficiently secured in the region lower than the mediums B1 to B6 in the second embodiment. On the other hand, reproduced outputs can be greatly lowered in the region upper than the comparison mediums BB6 to BB12. FIG. 4 also summarizes the results obtained above, in a different manner, where the horizontal axis expresses the magnetic permeability $\mu$ of the lower soft magnetic film and the vertical axis expresses the film thickness $\delta_b$ thereof. As seen from this FIG. 4, sufficient reproduced outputs can be secured where $\mu \cdot \delta_b \geq 1000$ is satisfied.

In case where the magnetic permeability $\mu$ of the lower soft magnetic film is two, sufficient reproduced outputs cannot be secured with respect to any of the film thicknesses $\delta_b$. Also, in case where the film thickness $\delta_b$ is 2 nm, sufficient reproduced outputs cannot be secured with respect to any of the permeabilities $\mu$. This is because the permeability $\mu$ and the film thickness $\delta_b$ are lower than required. Further, the reproduced output tends to decrease even when the film thickness $\delta_b$ of the lower soft magnetic film exceeds 500 nm. This is because the surface smoothness of the lower soft magnetic film is disturbed since the film thickness $\delta_b$ of the lower soft magnetic film is thicker than required. Consequently, the vertical orientation of the vertical magnetization film formed on the lower soft magnetic film is deteriorated. Hence, it is found that all values of ($\mu$, $\delta_b$) that satisfy the relationship of $\mu \cdot \delta_b \geq 1000$ cannot be always used for practical design even if the relationship of $\mu \cdot \delta_b \geq 1000$ is satisfied. It is necessary to satisfy the relationship of $\mu \cdot \delta_b \geq 1000$ and simultaneously to satisfy a relationship of $5 \leq \mu \leq 200$ and a relationship that $\delta_b$ is 500 nm or less.

On the other hand, a signal having a recording density of 300 kFRPI is recorded on the conventional mediums AB1 to AB4 and the conventional comparison mediums AC1 to AC6. Reproduced outputs are thereafter measured with a MR head. As shown in the first embodiment, the value of $\mu \cdot \delta_b = 1000$ is insufficient to obtain securely a recording/reproducing sensitivity but the value of $\mu \cdot \delta_b$ requires at least $\mu \cdot \delta_b = 2000$ or more. From this, it could be understood that a vertical two-layer medium which uses a $Fe_{84.9}Si_{9.6}Al_{5.5}$ film as its lower soft magnetic film can obtain more securely a recording/reproducing sensitivity than a vertical two-layer medium which uses a $Ni_{21.5}Fe_{78.5}$ film as its lower soft magnetic film, even if the value of $\mu \cdot \delta_b$ is small. In other words, the lower soft magnetic film can be designed to be thinner. This is because the $Fe_{84.9}Si_{9.6}Al_{5.5}$ film has smaller anisotropy and is more isotropic than the $Ni_{21.5}Fe_{78.5}$ film. Therefore, the $Fe_{84.9}Si_{9.6}Al_{5.5}$ film has a higher sensitivity to the magnetic field generated by the recording head, so that the recording/reproducing sensitivity is improved as a result.

From the above, if a $Fe_{84.9}Si_{9.6}Al_{5.5}$ film is used in place of a $Ni_{21.5}Fe_{78.5}$ film for a vertical two-layer medium, design can be made with a lower value of $\mu \cdot \delta_b$. If the relationship of $\mu \cdot \delta_b \geq 1000$ is satisfied and if relationships of $5 \leq \mu \leq 200$ and $\delta_b \leq 500$ nm are satisfied simultaneously where the magnetic permeability of the $Fe_{84.9}Si_{9.6}Al_{5.5}$ film is $\mu$ and the film thickness thereof is $\delta_b$, sufficient recording/reproducing sensitivity can be secured even in case where the vertical magnetic anisotropic energy Ku and the coercive force Hc in the direction vertical to the film surface are much greater than those of conventional vertical magnetization films, as in the second embodiment. As a conclusion, by using a $Fe_{84.9}Si_{9.6}Al_{5.5}$ film as a lower soft magnetic film and by satisfying the conditions of $\mu \cdot \delta_b \geq 1000$, $5 \leq \mu \leq 200$, and $\delta_b \leq 500$ nm, the lower soft magnetic film can be made thinner than in the case of using a $Ni_{21.5}Fe_{78.5}$ film which is often used conventionally as a lower soft magnetic film, even if where the vertical magnetic anisotropic energy Ku and the coercive force Hc in the direction vertical to the film surface are much greater than those of conventional CoCr-based vertical magnetization films (e.g., Ku is about $5 \times 10^6$ [erg/cc] and Hc is about 3 [kOe]), as in the case of the material used in the second embodiment. Accordingly, it is possible to obtain a novel vertical two-layer medium in which the lower soft magnetic film is made thin and a process of manufacturing a medium is made easier.

The Third Embodiment

Like the first embodiment, total seventy different kinds of samples with $Fe_{84.9}Si_{9.6}Al_{5.5}$ films were prepared by use of 84.9wt %Fe-9.6wt %Si-5.5wt %Al targets, i.e., $Fe_{84.9}Si_{9.6}Al_{5.5}$ films respectively having seven different magnetic permeabilities $\mu$ were prepared for every one of ten different film thicknesses $\delta_b$. Also, like the first embodiment, mediums were prepared using 60at %Fe-40at %Pt targets in place of the 50at %Fe-50at %Pt targets in the first embodiment, on $Fe_{84.9}Si_{9.6}Al_{5.5}$ films formed separately from those formed for the purpose of magnetic permeability measurement.

At this time, like the first embodiment, mediums with $Fe_{84.9}Si_{9.6}Al_{5.5}$ films having combinations of a permeability $\mu$ and a film thickness $\delta_b$ [nm] that satisfy $\mu \cdot \delta_b = 1000$, e.g., ($\mu$, $\delta_b$)=(5, 200), (10, 100), (20, 50), (50, 20), (100, 10), and (200, 5) were respectively named vertical magnetic recording mediums C1 to C6 according to the third embodiment. In addition, mediums with $Fe_{84.9}Si_{9.6}Al_{5.5}$ films having combinations of a permeability $\mu$ and a film thickness $\delta_b$ [nm] that satisfy $\mu \cdot \delta b=500$, e.g., ($\mu$, $\delta_b$)=(5, 100), (10, 50), (50, 10), and (100, 5) were respectively named comparison mediums CC1 to CC4. Also, a medium having $Fe_{84.9}Si_{9.6}Al_{5.5}$ films having combinations of a permeability $\mu$ and a film thickness $\delta_b$ [nm] that satisfies $\mu \cdot \delta_b = 400$, e.g., ($\mu$, $\delta_b$)=(20, 20) was named a comparison medium CC5. Further, mediums with $Fe_{84.9}Si_{9.6}Al_{5.5}$ films each having permeabilities $\mu=2$ to 200 and a film thickness $\delta_b=750$ nm were respectively named comparison mediums CC6 to CC12.

Also, in the second embodiment, like the first embodiment, conventional mediums AB1 to AB4 as vertical two-layer mediums having $Ni_{21.5}Fe_{78.5}$ films as the lower soft magnetic film were formed to have a permeability $\mu$ and a film thickness $\delta_b$ [nm] that satisfy $\mu \cdot \delta b=2000$, e.g., $(\mu, \delta_b)=(10, 200), (20, 100), (100, 20),$ and $(200, 10)$. Also, conventional comparison mediums AC1 to AC6 as vertical two-layer mediums having $Ni_{21.5}Fe_{78.5}$ films as the lower soft magnetic film were formed to have a permeability $\mu$ and a film thickness $\delta_b$ [nm] that satisfy $\mu \cdot \delta_b=1000$, e.g., $(\mu, \delta_b)=(5, 200), (10, 100), (20, 50), (50, 20), (100, 10),$ and $(200, 5)$.

Then, the vertical magnetic anisotropic energy Ku of each $Fe_{60}Pt_{40}$ film was measured by a magnetic torque meter to find $Ku=5 \times 10^7$ [erg/cc]. In addition, the coercive force in the direction vertical to the film surface was measured by a Kerr rotation angle measurement device to find $Hc=5.0$ [kOe].

Recording/reproducing tests were made to total seventy kinds of vertical magnetic recording mediums having seven different permeabilities for every one of ten different film thicknesses of lower soft magnetic films, under the same conditions as those of the first embodiment. Specifically, a signal having a recording density of 300 kFRPI was recorded, and thereafter, a reproduced output thereof was measured. Table 4 shows the values of reproduced outputs. This table 4 also shows which values belong to which of the mediums according to the third embodiment and the comparison mediums.

TABLE 4

Reproduced output

| $\delta b$ | $\mu$ | | | | | | |
|---|---|---|---|---|---|---|---|
| | 2 | 5 | 10 | 20 | 50 | 100 | 200 |
| 2 nm | 129 | 136 | 159 | 176 | 188 | 189 | 201 |
| 5 nm | 152 | 167 | 162 | 165 | 194 | 205 | 435 |
| 10 nm | 165 | 164 | 194 | 219 | 221 | 412 | 446 |
| 20 nm | 144 | 192 | 198 | 203 | 475 | 426 | 438 |
| 50 nm | 157 | 212 | 222 | 468 | 432 | 431 | 447 |
| 100 nm | 165 | 254 | 477 | 466 | 440 | 440 | 446 |
| 200 nm | 213 | 497 | 480 | 476 | 477 | 449 | 456 |
| 250 nm | 229 | 479 | 489 | 474 | 503 | 514 | 492 |
| 500 nm | 256 | 474 | 466 | 497 | 511 | 535 | 539 |
| 750 nm | 240 | 268 | 303 | 322 | 294 | 321 | 339 |

Unit: $\mu V$

*values of comparison mediums in solid line block
*values of mediums in the third embodiment in dotted line block As can be seen from the table 4, the reproduced outputs were sufficiently secured in the region lower than the mediums C1 to C6 in the third embodiment. On the other hand, reproduced outputs can be greatly lowered in the region upper than the comparison mediums CC6 to CC12. FIG. 4 also summarizes the results obtained above, in a different manner, where the horizontal axis expresses the magnetic permeability $\mu$ of the lower soft magnetic film and the vertical axis expresses the film thickness $\delta_b$ thereof. From this FIG. 4, it is found that sufficient reproduced outputs can be secured where $\mu \cdot \delta_b \geq 1000$ is satisfied.

In case where the magnetic permeability $\mu$ of the lower soft magnetic film is two, sufficient reproduced outputs cannot be secured with respect to any of the film thicknesses $\delta_b$. Also, in case where the film thickness $\delta_b$ is 2 nm, sufficient reproduced outputs cannot be secured with respect to any of the permeabilities $\mu$. This is because the permeability $\mu$ and the film thickness $\delta_b$ of the lower soft magnetic film were lower than required. Further, the reproduced output tends to decrease even when the film thickness $\delta_b$ of the lower soft magnetic film exceeds 500 nm. This is because the surface smoothness of the lower soft magnetic film is disturbed since the film thickness $\delta_b$ of the lower soft magnetic film is thicker than required. Consequently, the vertical orientation of the vertical magnetization film formed thereon is deteriorated. Hence, it is found that all values of $(\mu, \delta_b)$ that satisfy the relationship of $\mu \cdot \delta_b \geq 1000$ cannot be always used for practical design even if the relationship of $\mu \cdot \delta_b \geq 1000$ is satisfied. But, it is necessary to satisfy the relationship of $\mu \cdot \delta_b \geq 1000$ and to satisfy simultaneously a relationship of $5 \leq \mu \leq 200$ and a relationship that $\delta_b$ was 500 nm or less.

On the other hand, a signal having a recording density of 300 kFRPI was recorded on the conventional mediums AB1 to AB4 and the conventional comparison mediums AC1 to AC6. Reproduced outputs are thereafter measured with a MR head. As shown in the first embodiment, the value of $\mu \cdot \delta_b=1000$ is insufficient to obtain securely a recording/reproducing sensitivity but the value of $\mu \cdot \delta_b$ requires at least $\mu \cdot \delta_b=2000$ or more. From this, a vertical two-layer medium which uses a $Fe_{84.9}Si_{9.6}Al_{5.5}$ film as its lower soft magnetic film can obtain more securely a recording/reproducing sensitivity than a vertical two-layer medium which uses a $Ni_{21.5}Fe_{78.5}$ film as its lower soft magnetic film, even if the value of $\mu \cdot \delta_b$ is small. In other words, the lower soft magnetic film can be designed to be thinner. This is because the $Fe_{84.9}Si_{9.6}Al_{5.5}$ film has smaller anisotropy and is more isotropic than the $Ni_{21.5}Fe_{78.5}$ film. Therefore, the $Fe_{84.9}Si_{9.6}Al_{5.5}$ film has a higher sensitivity to the magnetic field generated by the recording head, so that the recording/reproducing sensitivity is improved as a result.

From the above, if a $Fe_{84.9}Si_{9.6}Al_{5.5}$ film is used in place of a $Ni_{21.5}Fe_{78.5}$ film for a vertical two-layer medium, design can be made with a lower value of $\mu \cdot \delta_b$. If the relationship of $\mu \cdot \delta_b \geq 1000$ was satisfied and if relationships of $5 \leq \mu \leq 200$ and $\delta_b \leq 500$ nm are simultaneously satisfied where the magnetic permeability of the $Fe_{84.9}Si_{9.6}Al_{5.5}$ film is $\mu$ and the film thickness thereof is $\delta_b$, a sufficient recording/reproducing sensitivity can be secured even in case where the vertical magnetic anisotropic energy Ku and the coercive force Hc in the direction vertical to the film surface are much greater than those of conventional vertical magnetization films, as in the present embodiment. As a result, by using a $Fe_{84.9}Si_{9.6}Al_{5.5}$ film as a lower soft magnetic film and by satisfying the conditions of $\mu \cdot \delta_b \geq 1000$, $5 \leq \mu \leq 200$, and $\delta_b \leq 500$ nm, the lower soft magnetic film can be made thinner than in the case of using a $Ni_{21.5}Fe_{78.5}$ film which is often used conventionally as a lower soft magnetic film, even if where the vertical magnetic anisotropic energy Ku and the coercive force Hc in the direction vertical to the film surface are much greater than those of conventional CoCr-based vertical magnetization films (e.g., Ku is about $5 \times 10^6$ [erg/cc] and Hc is about 3 [kOe]), as in the case of the material used in the present embodiment. Accordingly, it is possible to obtain a novel vertical two-layer medium in which the lower soft magnetic film can be made thin and a process of manufacturing a medium can be made easier.

It should be noted that since similar advantages were obtained by using respectively $Fe_{40}Pt_{60}$ films in the second embodiment, $Fe_{50}Pt_{50}$ films in the first embodiment, and $Fe_{60}Pt_{40}$ films in the third embodiment as vertical magnetization films, it is apparent that the vertical magnetic anisotropic energy is distributed within a range of $5 \times 10^7$ [erg/cc]$\leq$Ku$\leq 1 \times 10^8$ [erg/cc] and the coercive force in the direction vertical to the film surface is distributed within a range of 5 [kOe]$\leq$Hc$\leq$7 [kOe] as long as a $Fe_xPt_{100-x}$ film has X which falls in the range of $40 \leq X \leq 60$ in X at %Fe-(100-X)at %Pt. Hence, it was also apparent that similar advantages can be obtained as long as a $Fe_xPt_{100-x}$ film has X which falls in the range of $40 \leq X \leq 60$ in X at %Fe-(100-X)at %Pt.

The Fourth Embodiment

In the same manner as in the first embodiment, $Fe_{84.9}Si_{8.0}Al_{7.1}$ films were formed on substrates using 84.9wt %Fe-8.0wt %Si-7.1wt %Al targets in place of 84.9wt %Fe-9.6wt %Si-5.5wt %Al targets used in the first embodiment. Like the first embodiment, total seventy different kinds of $Fe_{84.9}Si_{8.0}Al_{7.1}$ films were prepared to have seven different magnetic permeabilities $\mu$ for every one of ten different film thicknesses $\delta_b$. Also, like the first embodiment, mediums were prepared using $YCo_5$ (at %) targets in place of the 50at %Fe-50at %Pt targets used in the first embodiment, on $Fe_{84.9}Si_{8.0}Al_{7.1}$ films formed separately from those formed for the purpose of measurement of magnetic permeability.

At this time, like the first embodiment, mediums with $Fe_{84.9}Si_{8.0}Al_{7.1}$ films having combinations of a permeability $\mu$ and a film thickness $\delta_b$ [nm] that satisfy $\mu \cdot \delta_b = 1000$, e.g., $(\mu, \delta_b)=(5, 200), (10, 100), (20, 50), (50, 20), (100, 10)$, and $(200, 5)$ were respectively named vertical magnetic recording mediums D1 to D6 according to the fourth embodiment. In addition, mediums with $Fe_{84.9}Si_{8.0}Al_{7.1}$ films having combinations of a permeability $\mu$ and a film thickness $\delta_b$ [nm] that satisfy $\mu \cdot \delta_b = 500$, e.g., $(\mu, \delta_b)=(5, 100), (10, 50), (50, 10)$, and $(100, 5)$ were respectively named comparison mediums DD1 to DD4. Also, a medium having $Fe_{84.9}Si_{8.0}Al_{7.1}$ films each having a permeability $\mu$ and a film thickness $\delta_b$ [nm] that satisfies $\mu \cdot \delta_b = 400$, e.g., $(\mu, \delta_b)=(20, 20)$ was named a comparison medium DD5. Further, mediums with $Fe_{84.9}Si_{8.0}Al_{7.1}$ films each having permeabilities $\mu = 2$ to 200 and a film thickness $\delta_b = 750$ nm were respectively named comparison mediums DD6 to DD12.

Also, in the fourth embodiment, like the first embodiment, conventional mediums AB1 to AB4 as vertical two-layer mediums having $Ni_{21.5}Fe_{78.5}$ films as the lower soft magnetic films were formed to have a permeability $\mu$ and a film thickness $\delta_b$ [nm] that satisfy $\mu \cdot \delta_b = 2000$, e.g., $(\mu, \delta_b)=(10, 200), (20, 100), (100, 20)$, and $(200, 10)$. Also, conventional comparison mediums AC1 to AC6 as vertical two-layer mediums having $Ni_{21.5}Fe_{78.5}$ films as the lower soft magnetic film were formed to have a permeability $\mu$ and a film thickness $\delta_b$ [nm] satisfy $\mu \cdot \delta_b = 1000$, e.g., $(\mu, \delta_b)=(5, 200), (10, 100), (20, 50), (50, 20), (100, 10)$, and $(200, 5)$.

Then, the vertical magnetic anisotropic energy Ku of each $YCO_5$ film was measured by a magnetic torque meter to find Ku=$1 \times 10^7$ [erg/cc]. In addition, the coercive force in the direction vertical to the film surface was measured by a Kerr rotation angle measurement device to find Hc=6.5 [kOe].

Recording/reproducing tests were carried out to total seventy kinds of vertical magnetic recording mediums having seven different permeabilities for every one of ten different film thicknesses of lower soft magnetic films, under the same conditions as those of the first embodiment. Specifically, a signal having a recording density of 300 kFRPI was recorded, and thereafter, a reproduced output thereof was measured. Table 5 shows the values of reproduced outputs. This table 5 also shows which values belong to which of the mediums according to the present embodiment and the comparison mediums.

TABLE 5

Reproduced output

| | $\mu$ | | | | | | |
|---|---|---|---|---|---|---|---|
| $\delta$ b | 2 | 5 | 10 | 20 | 50 | 100 | 200 |
| 2 nm | 132 | 137 | 162 | 178 | 192 | 196 | 212 |
| 5 nm | 158 | 162 | 166 | 167 | 191 | 212 | 443 |
| 10 nm | 161 | 163 | 191 | 226 | 229 | 425 | 435 |
| 20 nm | 146 | 197 | 199 | 212 | 478 | 427 | 434 |
| 50 nm | 152 | 203 | 215 | 469 | 455 | 434 | 452 |
| 100 nm | 167 | 253 | 471 | 467 | 446 | 443 | 444 |
| 200 nm | 214 | 496 | 488 | 482 | 476 | 455 | 452 |
| 250 nm | 231 | 477 | 495 | 478 | 513 | 517 | 496 |
| 500 nm | 259 | 76 | 467 | 500 | 516 | 537 | 541 |
| 750 nm | 249 | 276 | 325 | 329 | 296 | 327 | 336 |

Unit: $\mu$V

*values of comparison mediums in solid line block
*values of mediums in the third embodiment in dotted line block As can be seen from the table 5, the reproduced outputs were sufficiently secured in the region lower than the mediums D1 to D6 of the present embodiment. On the other hand, reproduced outputs can be greatly lowered in the region upper than the comparison mediums DD6 to DD12. FIG. 4 also summarizes the results obtained above, in a different manner, where the horizontal axis expresses the magnetic permeability $\mu$ of the lower soft magnetic film and the vertical axis expresses the film thickness $\delta_b$ thereof. From this FIG. 4, it is found that sufficient reproduced outputs can be secured where $\mu \cdot \delta_b \geq 1000$ is satisfied.

In case where the magnetic permeability $\mu$ of the lower soft magnetic film is two, sufficient reproduced outputs cannot be secured with respect to any of the film thicknesses $\delta_b$. In case where the film thickness $\delta_b$ is 2 nm, sufficient reproduced outputs cannot be secured with respect to any of the permeabilities $\mu$. This is because the permeability $\mu$ and the film thickness $\delta_b$ were lower than required. Further, the reproduced output tends to decrease even when the film thickness $\delta_b$ of the lower soft magnetic film exceeds 500 nm. This is because the surface smoothness of the lower soft magnetic film is disturbed since the film thickness $\delta_b$ of the lower soft magnetic film is thicker than required. Consequently, the vertical orientation of the vertical magnetization film formed thereon is deteriorated. Hence, it is found that all values of ($\mu$, $\delta_b$) that satisfy the relationship of $\mu \cdot \delta_{b \geq 1000}$ cannot be always used for practical design even if the relationship of $\mu \cdot \delta_b \geq 1000$ was satisfied. It is necessary to satisfy the relationship of $\mu \cdot \delta_b \geq 1000$ and simultaneously to satisfy a relationship of $5 \leq \mu \leq 200$ and a relationship that $\delta_b$ was 500 nm or less.

On the other hand, a signal having a recording density of 300 kFRPI is recorded on the conventional mediums AB1 to AB4 and the conventional comparison mediums AC1 to AC6. Reproduced outputs are thereafter measured with a MR head. As shown in the first embodiment, the value of $\mu \cdot \delta_b = 1000$ is insufficient to obtain securely a recording/reproducing sensitivity but the value of $\mu \cdot \delta_b$ requires at least $\mu \cdot \delta_b$=2000 or more. From this, a vertical two-layer medium which uses a $Fe_{84.9}Si_{8.0}Al_{7.1}$ film as its lower soft magnetic film can obtain more securely a recording/reproducing sensitivity than a vertical two-layer medium which uses a $Ni_{21.5}Fe_{78.5}$ film as its lower soft magnetic film, even if the value of $\mu \cdot \delta_b$ is small. In other words, the lower soft magnetic film can be designed to be thinner. This is because the $Fe_{84.9}Si_{8.0}Al_{7.1}$ film has smaller anisotropy and is more isotropic than the $Ni_{21.5}Fe_{78.5}$ film. Therefore, the $Fe_{84.9}Si_{8.0}Al_{7.1}$ film has a higher sensitivity to the magnetic field generated by the recording head, so that the recording/reproducing sensitivity is improved as a result.

From the above, if a $Fe_{84.9}Si_{8.0}Al_{7.1}$ film was used in place of a $Ni_{21.5}Fe_{78.5}$ film for a vertical two-layer medium, design can be made with a lower value of $\mu \cdot \delta_b$. If the relationship of $\mu \cdot \delta_b \geq 1000$ is satisfied and if relationships of $5 \leq \mu \leq 200$ and $\delta_b \leq 500$ nm are satisfied simultaneously where the magnetic permeability of the $Fe_{84.9}Si_{8.0}Al_{7.1}$ film is $\mu$ and the film thickness thereof is $\mu_b$, sufficient recording/reproducing sensitivity can be secured even in case where the vertical magnetic anisotropic energy Ku and the coercive force Hc in the direction vertical to the film surface are much greater than those of conventional vertical magnetization films, as in the fourth embodiment. As a conclusion, by using a $Fe_{84.9}Si_{8.0}Al_{7.1}$ film as a lower soft magnetic film and by satisfying the conditions of $\mu \cdot \delta_b \geq 1000$, $5 \leq \mu \leq 200$, and $\delta_b \leq 500$ nm, the lower soft magnetic film can be made thinner than in the case of using a $Ni_{21.5}Fe_{78.5}$ film which is often used conventionally as a lower soft magnetic film, even if where the vertical magnetic anisotropic energy Ku and the coercive force Hc in the direction vertical to the film surface are much greater than those of conventional CoCr-based vertical magnetization films (e.g., Ku is about $5 \times 10^6$ [erg/cc] and Hc is about 3 [kOe]), as in the case of the material used in the fourth embodiment. Accordingly, it is possible to obtain a novel vertical two-layer medium in which the lower soft magnetic film can be made thin and process of manufacturing a medium can be made easier.

The Fifth Embodiment

In the same manner as in the first embodiment, $Fe_{84.9}Si_{12.0}Al_{3.1}$ films were formed on substrates using 84.9wt %Fe-12.0wt %Si-3.1wt %Al targets in place of 84.9wt %Fe-9.6wt %Si-5.5wt %Al targets used in the first embodiment. Like the first embodiment, total seventy different kinds of $Fe_{84.9}Si_{12.0}Al_{3.1}$ films were prepared to have seven different magnetic permeabilities $\mu$ for every one of ten different film thicknesses $\delta_b$. Also, like the first embodiment, mediums were prepared using $CeCo_5$ (at %) targets in place of the 50at %Fe-50at %Pt targets used in the first embodiment, on $Fe_{84.9}Si_{12.0}Al_{3.1}$ films formed separately from those formed for the purpose of magnetic permeability measurement.

At this time, like the first embodiment, mediums with $Fe_{84.9}Si_{12.0}Al_{3.1}$ films having combinations of a permeability $\mu$ and a film thickness $\delta_b$ [nm] that satisfy $\mu \cdot \delta_b$=1000, e.g., $(\mu, \delta_b)$=(5, 200), (10, 100), (20, 50), (50, 20), (100, 10), and (200, 5) were respectively named vertical magnetic recording mediums E1 to E6 according to the fifth embodiment. In addition, mediums with $Fe_{84.9}Si_{12.0}Al_{3.1}$ films having combinations of a permeability $\mu$ and a film thickness $\delta_b$ [nm] that satisfy $\mu \cdot \delta_b$=500, e.g., $(\mu, \delta_b)$=(5, 100), (10, 50), (50, 10), and (100, 5) were respectively named comparison mediums EE1 to EE4. Also, a medium having $Fe_{84.9}Si12.0Al_{3.1}$ films having combinations of a permeability $\mu$ and a film thickness $\delta_b$ [nm] that satisfies $\mu \cdot \delta_b$=400, e.g., $(\mu, \delta_b)$=(20, 20) was named a comparison medium EE5.

Further, mediums having permeabilities $\mu$=2 to 200 and a film thickness $\delta_b$=750 nm were respectively named comparison mediums EE6 to EE12.

Also, in the fifth embodiment, like the first embodiment, conventional mediums AB1 to AB4 as vertical two-layer mediums having $Ni_{21.5}Fe_{78.5}$ as the lower soft magnetic films which were formed to have a permeability $\mu$ and a film thickness $\delta_b$ [nm] that satisfy $\mu \cdot \delta_b$=2000, e.g., $(\mu, \delta_b)$=(10, 200), (20, 100), (100, 20), and (200, 10). Also, conventional comparison mediums AC1 to AC6 as vertical two-layer mediums having $Ni_{21.5}Fe_{78.5}$ films as the lower soft magnetic film were formed to have a permeability $\mu$ and a film thickness $\delta_b$ [nm] that satisfy $\mu \cdot \delta_b$=1000, e.g., $(\mu, \delta_b)$=(5, 200), (10, 100), (20, 50), (50, 20), (100, 10), and (200, 5).

Then, the vertical magnetic anisotropic energy Ku of each $CeCo_5$ film was measured by a magnetic torque meter to find Ku=$5.5 \times 10^7$ [erg/cc]. In addition, the coercive force in the direction vertical to the film surface was measured by a Kerr rotation angle measurement device to find Hc=6.5 [kOe].

Recording/reproducing tests were made to total seventy kinds of vertical magnetic recording mediums having seven different permeabilities for every one of ten different film thicknesses of lower soft magnetic films, under the same conditions as those of the first embodiment. Specifically, a signal having a recording density of 300 kFRPI was recorded, and thereafter, a reproduced output thereof was measured. Table 6 shows the values of reproduced outputs. This table 6 also shows which values belong to which of the mediums according to the present embodiment and the comparison mediums.

TABLE 6

Reproduced outputs

| $\delta b$ | $\mu$ | | | | | | |
|---|---|---|---|---|---|---|---|
| | 2 | 5 | 10 | 20 | 50 | 100 | 200 |
| 2 nm | 138 | 139 | 168 | 175 | 197 | 194 | 222 |
| 5 nm | 156 | 160 | 169 | 168 | 193 | 219 | 444 |
| 10 nm | 160 | 167 | 196 | 227 | 232 | 427 | 439 |
| 20 nm | 147 | 192 | 196 | 210 | 465 | 435 | 446 |
| 50 nm | 149 | 211 | 218 | 475 | 459 | 436 | 457 |
| 100 nm | 167 | 249 | 474 | 469 | 448 | 441 | 449 |
| 200 nm | 217 | 492 | 489 | 480 | 477 | 459 | 450 |
| 250 nm | 237 | 475 | 499 | 475 | 516 | 503 | 497 |
| 500 nm | 256 | 474 | 474 | 503 | 514 | 539 | 552 |
| 750 nm | 232 | 274 | 311 | | 336 | 302 | 333 |

Unit: μ V

*values of comparison mediums in solid line block
*values of mediums in the fourth embodiment in dotted line block As can be seen from the table 6, the reproduced outputs were sufficiently secured in the region lower than the mediums E1 to E6 of the present embodiment. On the other hand, reproduced outputs can be greatly lowered in the region upper than the comparison mediums EE6 to EE12. FIG. 4 also summarizes the results obtained above, in a different manner, where the horizontal axis expresses the magnetic permeability $\mu$ of the lower soft magnetic film and the vertical axis expresses the film thickness $\delta_b$ thereof. From FIG. 4, it is found that sufficient reproduced outputs can be secured where $\mu \cdot \delta_b \geq 1000$ is satisfied.

Also, in case where the magnetic permeability $\mu$ of the lower soft magnetic film is two, sufficient reproduced outputs cannot be secured with respect to any of the film thicknesses $\delta_b$, Also, in case where the film thickness $\delta_b$ is 2 nm, sufficient reproduced outputs cannot be secured with respect to any of the permeabilities $\mu$. This is because the permeability $\mu$ and the film thickness $\delta_b$ were lower than required. Further, the reproduced output tends to decrease even when the film thickness $\delta_b$ of the lower soft magnetic film exceeds 500 nm. This is because the surface smoothness of the lower soft magnetic film is disturbed since the film thickness $\delta_b$ of the lower soft magnetic film is thicker than required. Consequently, the vertical orientation of the vertical magnetization film formed on the lower soft magnetic film is deteriorated. Hence, it is found that all values of ($\mu$, $\delta_b$) that satisfy the relationship of $\mu \cdot \delta_b \geq 1000$ cannot be always used for practical design even if the relationship of $\mu \cdot \delta_b \geq 1000$ was satisfied. It is necessary to satisfy the relationship of $\mu \cdot \delta_b \geq 1000$ and to satisfy simultaneously a relationship of $5 \leq \mu \leq 200$ and a relationship that $\delta_b$ was 500 nm or less.

On the other hand, a signal having a recording density of 300 kFRPI is recorded on the conventional mediums AB1 to AB4 and the conventional comparison mediums AC1 to AC6. Reproduced outputs were thereafter measured with a MR head. As shown in the first embodiment, the value of $\mu \cdot \delta_b = 1000$ is insufficient to obtain securely a recording/reproducing sensitivity but the value of $\mu \cdot \delta_b$ requires at least $\mu \cdot \delta_b = 2000$ or more. From this, a vertical two-layer medium which uses a $Fe_{84.9}Si_{12.0}Al_{3.1}$ film as its lower soft magnetic film can obtain more securely a recording/reproducing sensitivity than a vertical two-layer medium which uses a $Ni_{21.5}Fe_{78.5}$ film as its lower soft magnetic film, even if the value of $\mu \cdot \delta_b$ is small. In other words, the lower soft magnetic film can be designed to be thinner. This is because the $Fe_{84.9}Si_{12.0}Al_{3.1}$ film has smaller anisotropy and is more isotropic than the $Ni_{21.5}Fe_{78.5}$ film. Therefore, the $Fe_{84.9}Si_{12.0}Al_{3.1}$ film has a higher sensitivity to the magnetic field generated by the recording head, so that the recording/reproducing sensitivity is improved as a result.

From the above, if a $Fe_{84.9}Si_{12.0}Al_{3.1}$ film was used in place of a $Ni_{21.5}Fe_{78.5}$ film for a vertical two-layer medium, design can be made with a lower value of $\mu \cdot \delta_b$. If the relationship of $\mu \cdot \delta_b \geq 1000$ was satisfied and if relationships of $5 \leq \mu \leq 200$ and $\delta_b \leq 500$ nm were satisfied simultaneously where the magnetic permeability of the $Fe_{84.9}Si_{12.0}Al_{3.1}$ film is $\mu$ and the film thickness thereof is $\delta_b$, sufficient recording/reproducing sensitivity can be secured even in case where the vertical magnetic anisotropic energy Ku and the coercive force Hc in the direction vertical to the film surface are much greater than those of conventional vertical magnetization films, as in the present embodiment. As a conclusion, by using a $Fe_{84.9}Si_{12.0}Al_{3.1}$ film as a lower soft magnetic film and by satisfying the conditions of $v \cdot \delta_b \geq 1000$, $5 \leq \mu \leq 200$, and $\delta_b \leq 500$ nm, the lower soft magnetic film can be more thinned than in the case of using a $Ni_{21.5}Fe_{78.5}$ film which is often used conventionally as a lower soft magnetic film, even if where the vertical magnetic anisotropic energy Ku and the coercive force Hc in the direction vertical to the film surface are much greater than those of conventional CoCr-based vertical magnetization films (e.g., Ku is about $5 \times 10^6$ [erg/cc] and Hc is about 3 [kOe]), as in the case of the material used in the fifth embodiment. Accordingly, it is possible to obtain a novel vertical two-layer medium in which the lower soft magnetic film can be made thinner and a process of manufacturing a medium can be made easier.

It should be noted that since similar advantages are obtained by using respectively $Fe_{84.9}Si_{8.0}Al_{7.1}$ films in the fourth embodiment, $Fe_{84.9}Si_{9.6}Al_{5.5}$ films in the first embodiment, and $Fe_{84.9}Si_{12.0}Al_{3.1}$ films in the fifth embodiment as vertical magnetization films, it is apparent that similar advantages can be obtained as long as a $Fe_{84.9}$-$Si_X$-$Al_{15.1-X}$ lower soft magnetic film has X which falls in the range of $8.0 \leq X \leq 12.0$ (wt %) in $Fe_{84.9}$-$Si_X$-$Al_{15.1-X}$.

The Sixth Embodiment

In the same manner as in the first embodiment, $Co_{62}Ni_{12}Fe_{26}$ films were formed on substrates using 62wt %Co-12wt %Ni-26wt %Fe targets in place of 84.9wt %Fe-9.6wt %Si-5.5wt %Al targets used in the first embodiment. Like the first embodiment, total seventy different kinds of $Co_{62}Ni_{12}Fe_{26}$ films were prepared to have seven different magnetic permeabilities $\mu$ for every one of ten different film thicknesses $\delta_b$. Also, like the first embodiment, mediums were prepared using $SmCo_5$ (at %) targets in place of the 50at %Fe-50at %Pt targets used in the first embodiment, on $Co_{62}Ni_{12}Fe_{26}$ films formed separately from those formed for the purpose of magnetic permeability measurement.

At this time, like the first embodiment, mediums having $Co_{62}Ni_{12}Fe_{26}$ films having combinations of a permeability $\mu$ and a film thickness $\delta_b$ [nm] that satisfy $\mu \cdot \delta_b = 1000$, e.g., ($\mu$, $\delta_b$)=(5, 200), (10, 100), (20, 50), (50, 20), (100, 10), and (200, 5) were respectively named vertical magnetic recording mediums F1 to F6 according to the present embodiment. In addition, mediums having $Co_{62}Ni_{12}Fe_{26}$ films having combinations of a permeability $\mu$ and a film thickness $\delta_b$ [nm] that satisfy $\mu \cdot \delta_b = 500$, e.g., ($\mu$, $\delta_b$)=(5, 100), (10, 50), (50, 10), and (100, 5) were respectively named comparison mediums FF1 to FF4. Also, a medium having $Co_{62}Ni_{12}Fe_{26}$ films having combinations of a permeability $\mu$ and a film thickness $\delta_b$ [nm] that satisfies $v \cdot \delta_b = 400$, e.g., ($v$, 5b)=(20, 20) was named a comparison medium FF5. Further, mediums having $Co_{62}Ni_{12}Fe_{26}$ films each having permeabilities $\mu = 2$ to 200 and a film thickness $\delta_b = 750$ nm were respectively named comparison mediums FF6 to FF12.

Also, in the fifth embodiment, like the first embodiment, conventional mediums AB1 to AB4 as vertical two-layer mediums having $Ni_{21.5}Fe_{78.5}$ as the lower soft magnetic films were formed to have a permeability $\mu$ and a film thickness $\delta_b$ [nm] that satisfy $\mu \cdot \delta_b = 2000$, e.g., ($\mu$, $\delta_b$)=(10, 200), (20, 100), (100, 20), and (200, 10). Also, conventional comparison mediums AC1 to AC6 as vertical two-layer mediums having $Ni_{21.5}Fe_{78.5}$ films as the lower soft magnetic film were formed to have a permeability $\mu$ and a film thickness $\delta_b$ [nm] that satisfy $\mu \cdot \delta_b = 1000$, e.g., ($\mu$, $\delta_b$)=(5, 200), (10, 100), (20, 50), (50, 20), (100, 10), and (200, 5).

Then, the vertical magnetic anisotropic energy Ku of each $SmCo_5$ film was measured by a magnetic torque meter to find Ku=$1 \times 10^8$ [erg/cc]. In addition, the coercive force in the direction vertical to the film surface was measured by a Kerr rotation angle measurement device to find Hc=7.0 [kOe].

Recording/reproducing tests were made to total seventy kinds of vertical magnetic recording mediums having seven different permeabilities for every one of ten different film thicknesses of lower soft magnetic films, under the same conditions as those of the first embodiment. Specifically, a signal having a recording density of 300 kFRPI was recorded, and thereafter, a reproduced output thereof was measured. Table 7 shows the values of reproduced outputs. This table 7 also shows which values belong to which of the mediums according to the present embodiment and the comparison mediums.

TABLE 7

Reproduced output

| δb | μ | | | | | | |
|---|---|---|---|---|---|---|---|
| | 2 | 5 | 10 | 20 | 50 | 100 | 200 |
| 2 nm | 127 | 134 | 166 | 172 | 198 | 191 | 227 |
| 5 nm | 155 | 167 | 164 | 156 | 192 | 216 | 432 |
| 10 nm | 164 | 169 | 201 | 224 | 237 | 431 | 442 |
| 20 nm | 144 | 196 | 198 | 211 | 464 | 436 | 447 |
| 50 nm | 143 | 210 | 223 | 477 | 464 | 438 | 459 |
| 100 nm | 164 | 252 | 470 | 476 | 449 | 440 | 454 |
| 200 nm | 213 | 497 | 494 | 487 | 474 | 462 | 459 |
| 250 nm | 230 | 474 | 494 | 477 | 514 | 505 | 497 |
| 500 nm | 259 | 471 | 478 | 510 | 517 | 541 | 549 |
| 750 nm | 241 | 277 | 323 | 331 | 318 | 326 | 329 |

Unit: μV

*values of comparison mediums in solid line block
*values of mediums in the sixth embodiment in dotted line block As can be seen from the table 7, the reproduced outputs are sufficiently secured in the region lower than the mediums F1 to F6 of the present embodiment. On the other hand, reproduced outputs can be greatly lowered in the region upper than the comparison mediums FF6 to FF12. FIG. 4 also summarizes the results obtained above, in a different manner, where the horizontal axis expresses the magnetic permeability $\mu$ of the lower soft magnetic film and the vertical axis expresses the film thickness $\delta_b$ thereof. From this FIG. 4, it is found that sufficient reproduced outputs can be secured where $\mu \cdot \delta_b \geq 1000$ is satisfied.

In case where the magnetic permeability $\mu$ of the lower soft magnetic film is two, sufficient reproduced outputs cannot be secured with respect to any of the film thicknesses $\delta_b$. In case where the film thickness $\delta_b$ is 2 nm, sufficient reproduced outputs cannot be secured with respect to any of the permeabilities $\mu$. This is because the permeability $\mu$ and the film thickness $\delta_b$ were lower than required. Further, the reproduced output tends to decrease even when the film thickness $\delta_b$ of the lower soft magnetic film exceeds 500 nm. This is because the surface smoothness of the lower soft magnetic film is disturbed since the film thickness $\delta_b$ of the lower soft magnetic film is thicker than required. Consequently, the vertical orientation of the vertical magnetization film formed on the lower soft magnetic film is deteriorated. Hence, it is found that all values of ($\mu$, $\delta_b$) that satisfy the relationship of $\mu \cdot \delta_b \geq 1000$ cannot be always used for practical design even if the relationship of $v \cdot \delta_b \geq 1000$ is satisfied. It is necessary to satisfy the relationship of $\mu \cdot \delta_b \geq 1000$ and simultaneously to satisfy a relationship of $5 \leq \mu \leq 200$ and a relationship that $\delta_b$ was 500 nm or less.

On the other hand, a signal having a recording density of 300 kFRPI is recorded on the conventional mediums AB1 to AB4 and the conventional comparison mediums AC1 to AC6. Reproduced outputs are thereafter measured with a MR head. As shown in the first embodiment, the value of $\mu \cdot \delta_b = 1000$ is insufficient to obtain securely a recording/reproducing sensitivity but the value of $\mu \cdot \delta_b$ requires at least $\mu \cdot \delta_b = 2000$ or more. From this, a vertical two-layer medium which uses a $Co_{62}Ni_{12}Fe_{26}$ film as its lower soft magnetic film can obtain more securely a recording/reproducing sensitivity than a vertical two-layer medium which uses a $Ni_{21.5}Fe_{78.5}$ film as its lower soft magnetic film, even if the value of $\mu \cdot \delta_b$ is small. In other words, the lower soft magnetic film can be designed to be thinner. This is because the $Co_{62}Ni_{12}Fe_{26}$ film has greater saturation magnetization than the $Ni_{21.5}Fe_{78.5}$ film. Therefore, the $Co_{62}Ni_{12}Fe_{26}$ film has a higher sensitivity to the magnetic field generated by the recording head, so that the recording/reproducing sensitivity is improved as a result.

From the above, if a $Co_{62}Ni_{12}Fe_{26}$ film is used in place of a $Ni_{21.5}Fe_{78.5}$ film for a vertical two-layer medium, design can be made with a lower value of $\mu \cdot \delta_b$. If the relationship of $\mu \cdot \delta_b \geq 1000$ is satisfied and if relationships of $5 \leq \mu \leq 200$ and $\delta_b \leq 500$ nm are satisfied simultaneously where the magnetic permeability of the $Co_{62}Ni_{12}Fe_{26}$ film is $\mu$ and the film thickness thereof is $\delta_b$, sufficient recording/reproducing sensitivity can be secured even in case where the vertical magnetic anisotropic energy Ku and the coercive force Hc in the direction vertical to the film surface are much greater than those of conventional vertical magnetization films, as in the sixth embodiment. As a conclusion, by using a $Co_{62}Ni_{12}Fe_{26}$ film as a lower soft magnetic film and by satisfying the conditions of $\mu \cdot \delta_b \geq 1000$, $5 \leq \mu \leq 200$, and $\delta_b \leq 500$ nm, the lower soft magnetic film can be made thinner than in the case of using a $Ni_{21.5}Fe_{78.5}$ film which is often used conventionally as a lower soft magnetic film, even if where the vertical magnetic anisotropic energy Ku and the coercive force Hc in the direction vertical to the film surface are much greater than those of conventional CoCr-based vertical magnetization films (e.g., Ku is about $5 \times 10^6$ [erg/cc] and Hc is about 3 [kOe]), as in the case of the material used in the present embodiment. Accordingly, it is possible to obtain a novel vertical two-layer medium which enables thinning of the lower soft magnetic film and easier process of manufacturing a medium.

The Seventh Embodiment

Like the first embodiment, total seventy different kinds of samples having $Fe_{84.9}Si_{9.6}Al_{5.5}$ films were prepared by use of 84.9wt %Fe-9.6wt %Si-5.5wt %Al targets, i.e., $Fe_{84.9}Si_{9.6}Al_{5.5}$ films respectively having seven different magnetic permeabilities $\mu$ were prepared for every one of ten different film thicknesses $\delta_b$. Also, like the first embodiment, mediums were prepared using $Y_2Co_{17}$ (at %) targets in place of the 50at %Fe-50at %Pt targets used in the first embodiment, on $Fe_{84.9}Si_{9.6}Al_{5.5}$ films formed separately from those formed for the purpose of measurement of magnetic permeability. At this time, like the first embodiment, mediums with $Fe_{84.9}Si_{9.6}Al_{5.5}$ films having combinations of a permeability $\mu$ and a film thickness $\delta_b$ [nm] that satisfy $\mu \cdot \delta_b = 1000$, e.g., ($\mu$, $\delta_b$)=(5, 200), (10, 100), (20, 50), (50, 20), (100, 10), and (200, 5) were respectively named vertical magnetic recording mediums G1 to G6 according to the seventh embodiment. In addition, mediums with $Fe_{84.9}Si_{9.6}Al_{5.5}$ films having combinations of a permeability $\mu$ and a film thickness $\delta_b$ [nm] that satisfy $\mu \cdot \delta_b = 500$, e.g., ($\mu$, $\delta_b$)=(5, 100), (10, 50), (50, 10), and (100, 5) were respectively named comparison mediums GG1 to GG4. Also, a medium having $Fe_{84.9}Si_{9.6}Al_{5.5}$ films having combinations of a permeability $\mu$ and a film thickness $\delta_b$ [nm] that satisfies $\mu \cdot \delta_b = 400$, e.g., ($\mu$, $\delta_b$)=(20, 20) was named a comparison medium GG5. Further, mediums with $Fe_{84.9}Si_{9.6}Al_{5.5}$ films each having permeabilities $\mu = 2$ to 200 and a film thickness $\delta_b = 750$ nm were respectively named comparison mediums GG6 to GG12.

Also, in the seventh embodiment, like the first embodiment, conventional mediums AB1 to AB4 as vertical two-layer mediums having $Ni_{21.5}Fe_{78.5}$ as the lower soft magnetic films were formed to have a permeability $\mu$ and a film thickness $\delta_b$ [nm] that satisfy $\mu \cdot \delta_b = 2000$, e.g., ($\mu$, $\delta_b$)=(10, 200), (20, 100), (100, 20), and (200, 10). Also, conventional comparison mediums AC1 to AC6 as vertical two-layer mediums having $Ni_{21.5}Fe_{78.5}$ films as the lower soft magnetic film were formed to have a permeability $\mu$ and a film thickness $\delta_b$ [nm] that satisfy $\mu \cdot \delta_b = 1000$, e.g., ($\mu$, $\delta b$)=(5, 200), (10, 100), (20, 50), (50, 20), (100, 10), and (200, 5).

Then, the vertical magnetic anisotropic energy Ku of each $Y_2Co_{17}$ film was measured by a magnetic torque meter to find $Ku=2\times10^8$ [erg/cc]. In addition, the coercive force in the direction vertical to the film surface was measured by a Kerr rotation angle measurement device to find Hc=8.0 [kOe].

Recording/reproducing tests were made on total seventy kinds of vertical magnetic recording mediums having seven different permeabilities for every one of ten different film thicknesses of lower soft magnetic films, under the same conditions as those of the first embodiment. Specifically, a signal having a recording density of 300 kFRPI was recorded, and thereafter, a reproduced output thereof was measured. Table 8 shows the values of reproduced outputs. This table 8 also shows which values belong to which of the mediums according to the seventh embodiment and the comparison mediums.

TABLE 8

Reproduced outputs

| $\delta b$ | $\mu$ | | | | | | |
|---|---|---|---|---|---|---|---|
| | 2 | 5 | 10 | 20 | 50 | 100 | 200 |
| 2 nm | 125 | 137 | 160 | 177 | 194 | 196 | 225 |
| 5 nm | 159 | 175 | 163 | 158 | 195 | 218 | 437 |
| 10 nm | 162 | 174 | 215 | 222 | 234 | 437 | 446 |
| 20 nm | 147 | 195 | 196 | 202 | 469 | 432 | 441 |
| 50 nm | 142 | 211 | 229 | 467 | 468 | 432 | 464 |
| 100 nm | 167 | 258 | 474 | 479 | 454 | 445 | 457 |
| 200 nm | 217 | 491 | 498 | 496 | 470 | 464 | 452 |
| 250 nm | 224 | 471 | 497 | 494 | 509 | 510 | 513 |
| 500 nm | 254 | 477 | 470 | 517 | 513 | 542 | 554 |
| 750 nm | 237 | 279 | 325 | 339 | 312 | 324 | 316 |

Unit: μ V

*values of comparison mediums in solid line block
*values of mediums in the seventh embodiment in dotted line block As can be seen from the table 8, the reproduced outputs are sufficiently secured in the region lower than the mediums G1 to G6 of the present embodiment. On the other hand, reproduced outputs can be greatly lowered in the region upper than the comparison mediums GG6 to GG12. FIG. 4 also summarizes the results obtained above, in a different manner, where the horizontal axis expresses the magnetic permeability $\mu$ of the lower soft magnetic film and the vertical axis expresses the film thickness $\delta_b$ on the lower soft magnetic film. From this FIG. 4, it is found that sufficient reproduced outputs can be secured where $\mu \cdot \delta_b \geq 1000$ is satisfied.

In case where the magnetic permeability $\mu$ of the lower soft magnetic film is two, sufficient reproduced outputs cannot be secured with respect to any of the film thicknesses $\delta_b$. Also, in case where the film thickness $\delta_b$ is 2 nm, sufficient reproduced outputs cannot be secured with respect to any of the permeabilities $\mu$. This is because the permeability $\mu$ and the film thickness $\delta_b$ are lower than required. Further, the reproduced output tends to decrease even when the film thickness $\delta_b$ of the lower soft magnetic film exceeds 500 nm. This is because the surface smoothness of the lower soft magnetic film is disturbed since the film thickness $\delta_b$ of the lower soft magnetic film is thicker than required. Consequently, the vertical orientation of the vertical magnetization film formed on the lower soft magnetic film is deteriorated. Hence, it is found that all values of ($\mu$, $\delta_b$) that satisfy the relationship of $\mu \cdot \delta_b \geq 1000$ cannot be always used for practical design even if the relationship of $\mu \cdot \delta_b \geq 1000$ is satisfied. It is necessary to satisfy the relationship of $\mu \cdot \delta b \geq 1000$ and to satisfy simultaneously a relationship of $5 \leq \mu \leq 200$ and a relationship that $\delta_b$ was 500 nm or less.

On the other hand, a signal having a recording density of 300 kFRPI is recorded on the conventional mediums AB1 to AB4 and the conventional comparison mediums AC1 to AC6. Reproduced outputs are thereafter measured with a MR head. As shown in the first embodiment, the value of $\mu \cdot \delta_b = 1000$ is insufficient to obtain securely a recording/reproducing sensitivity but the value of $\mu \cdot \delta_b$ requires at least $\mu \cdot \delta_b = 2000$ or more. From this, a vertical two-layer medium which uses a $Fe_{84.9}Si_{9.6}Al_{5.5}$ film as its lower soft magnetic film can obtain more securely a recording/reproducing sensitivity than a vertical two-layer medium which uses a $Ni_{21.5}Fe_{78.5}$ film as its lower soft magnetic film, even if the value of $\mu \cdot \delta_b$ is small. In other words, the lower soft magnetic film can be designed to be thinner. This is because the $Fe_{84.9}Si_{9.6}Al_{5.5}$ film has smaller anisotropy and is more isotropic than the $Ni_{21.5}Fe_{78.5}$ film. Therefore, the $Fe_{84.9}Si_{9.6}Al_{5.5}$ film has a higher sensitivity to the magnetic field generated by the recording head, so that the recording/reproducing sensitivity is improved as a result.

From the above, if a $Fe_{84.9}Si_{9.6}Al_{5.5}$ film was used in place of a $Ni_{21.5}Fe_{78.5}$ film for a vertical two-layer medium, design can be made with a lower value of $\mu \cdot \delta_b$. If the relationship of $\mu \cdot \delta_b \geq 1000$ was satisfied and if relationships of $5 \leq \mu \leq 200$ and $\delta_b \leq 500$ nm are satisfied simultaneously where the magnetic permeability of the $Fe_{84.9}Si_{9.6}Al_{5.5}$ film is $\mu$ and the film thickness thereof is $\delta_b$, a sufficient recording/reproducing sensitivity can be secured even in case where the vertical magnetic anisotropic energy Ku and the coercive force Hc in the direction vertical to the film surface are much greater than those of conventional vertical magnetization films, as in the seventh embodiment. As a conclusion, by using a $Fe_{84.9}Si_{9.6}Al_{5.5}$ film as a lower soft magnetic film and by satisfying the conditions of $\mu \cdot \delta_b \geq 1000$, $5 \leq \mu \leq 200$, and $\delta_b \leq 500$ nm, the lower soft magnetic film can be more thinned than in the case of using a $Ni_{21.5}Fe_{78.5}$ film which is often used conventionally as a lower soft magnetic film, even if where the vertical magnetic anisotropic energy Ku and the coercive force Hc in the direction vertical to the film surface are much greater than those of conventional CoCr-based vertical magnetization films (e.g., Ku is about $5\times10^6$ [erg/cc] and Hc is about 3 [kOe]), as in the case of the material used in the present embodiment. Accordingly, it is possible to obtain a novel vertical two-layer medium in which the lower soft magnetic film can be made thinner and a process of manufacturing a medium can be made easier.

The Eighth Embodiment

Like the first embodiment, total seventy different kinds of $Fe_{84.9}Si_{9.6}Al_{5.5}$ films were prepared by use of 84.9wt %Fe-9.6wt %Si-5.5wt %Al targets, i.e., $Fe_{84.9}Si_{9.6}Al_{5.5}$ films respectively having seven different magnetic permeabilities $\mu$ were prepared for every one of ten different film thicknesses $\delta_b$. Also, like the first embodiment, mediums were prepared using $CeCo_{17}$ (at %) targets in place of the 50at %Fe-50at %Pt targets used in the first embodiment, on $Fe_{84.9}Si_{9.6}Al_{5.5}$ films formed separately from those formed for the purpose of measurement of magnetic permeability.

At this time, like the first embodiment, mediums with $Fe_{84.9}Si_{9.6}Al_{5.5}$ films having combinations of a permeability $\mu$ and a film thickness $\delta_b$ [nm] that satisfy $\mu \cdot \delta_b = 1000$, e.g., $(\mu, \delta_b) = (5, 200), (10, 100), (20, 50), (50, 20), (100, 10),$ and $(200, 5)$ were respectively named vertical magnetic recording mediums H1 to H6 according to the present embodiment. In addition, mediums with $Fe_{84.9}Si_{9.6}Al_{5.5}$ films having combinations of a permeability $\mu$ and a film thickness $\delta_b$ [nm] that satisfy $\mu \cdot \delta_b = 500$, e.g., $(\mu, \delta_b) = (5, 100), (10, 50), (50, 10),$ and $(100, 5)$ were respectively named comparison mediums HH1 to HH4. Also, a medium having a combination which satisfies $\mu \cdot \delta_b = 400$, e.g., $(\mu, \delta_b) = (20, 20)$ was named a comparison medium HH5. Further, mediums with $Fe_{84.9}Si_{9.6}Al_{5.5}$ films each having permeabilities $\mu=2$ to 200 and a film thickness $\delta_b=750$ nm were respectively named comparison mediums HH6 to HH12.

Also, in the eighth embodiment, like the first embodiment, conventional mediums AB1 to AB4 as vertical two-layer mediums having $Ni_{21.5}Fe_{78.5}$ as the lower soft magnetic films which were formed to have a permeability $\mu$ and a film thickness $\delta_b$ [nm] that satisfy $\mu \cdot \delta_b = 2000$, e.g., $(\mu, \delta_b) = (10, 200), (20, 100), (100, 20),$ and $(200, 10)$. Also, conventional comparison mediums AC1 to AC6 as vertical two-layer mediums having $Ni_{21.5}Fe_{78.5}$ as the lower soft magnetic films were formed to have a permeability $\mu$ and a film thickness $\delta_b$ [nm] that satisfy $\mu \cdot \delta_b = 1000$, e.g., $(\mu, \delta_b) = (5, 200), (10, 100), (20, 50), (50, 20), (100, 10),$ and $(200, 5)$.

Then, the vertical magnetic anisotropic energy Ku of each $CeCo_{17}$ film was measured by a magnetic torque meter to find $Ku=5 \times 10^8$ [erg/cc]. In addition, the coercive force in the direction vertical to the film surface was measured by a Kerr rotation angle measurement device to find Hc=8.5 [kOe].

Recording/reproducing tests were made on total seventy kinds of vertical magnetic recording mediums having seven different permeabilities for every one of ten different film thicknesses of lower soft magnetic films, under the same conditions as those of the first embodiment. Specifically, a signal having a recording density of 300 kFRPI was recorded, and thereafter, a reproduced output thereof was measured. Table 9 shows the values of reproduced outputs. This table 9 also shows which values belong to which of the mediums according to the present embodiment and the comparison mediums.

TABLE 9

Reproduced Outputs

| $\delta_b$ | $\mu$ | | | | | | |
|---|---|---|---|---|---|---|---|
| | 2 | 5 | 10 | 20 | 50 | 100 | 200 |
| 2 nm | 132 | 134 | 158 | 174 | 197 | 199 | 215 |
| 5 nm | 161 | 177 | 166 | 159 | 191 | 206 | 434 |
| 10 nm | 167 | 173 | 210 | 227 | 230 | 403 | 447 |
| 20 nm | 142 | 197 | 199 | 208 | 464 | 412 | 446 |
| 50 nm | 147 | 210 | 232 | 469 | 462 | 429 | 467 |
| 100 nm | 172 | 259 | 477 | 486 | 459 | 438 | 451 |
| 200 nm | 210 | 497 | 502 | 497 | 476 | 435 | 454 |
| 250 nm | 221 | 478 | 493 | 497 | 516 | 520 | 519 |
| 500 nm | 258 | 470 | 476 | 514 | 517 | 509 | 557 |
| 750 nm | 239 | 286 | 324 | 322 | 317 | 315 | 305 |

Unit: $\mu$ V

*values of comparison mediums in solid line block
*values of mediums in the eighth embodiment in dotted line block As can be seen from the table 9, the reproduced outputs are sufficiently secured in the region lower than the mediums H1 to H6 of the eighth embodiment. On the other hand, reproduced outputs can be greatly lowered in the region upper than the comparison mediums HH6 to HH12. FIG. 4 also summarizes the results obtained above, in a different manner, where the horizontal axis expresses the magnetic permeability $\mu$ of the lower soft magnetic film and the vertical axis expresses the film thickness $\delta_b$ thereof. From this FIG. 4, it is found that sufficient reproduced outputs can be secured where $\mu \cdot \delta_b \geq 1000$ is satisfied.

In case where the magnetic permeability $\mu$ of the lower soft magnetic film is two, sufficient reproduced outputs cannot be secured with respect to any of the film thicknesses $\delta_b$. In case where the film thickness $\delta_b$ is 2 nm, sufficient reproduced outputs cannot be secured with respect to any of the permeabilities $\mu$. This is because the permeability $\mu$ and the film thickness $\delta_b$ are lower than required. Further, the reproduced output tends to decrease even when the film thickness $\delta_b$ of the lower soft magnetic film exceeds 500 nm. This is because the surface smoothness of the lower soft magnetic film is disturbed since the film thickness $\delta_b$ of the lower soft magnetic film is thicker than required. Consequently, the vertical orientation of the vertical magnetization film formed on the lower soft magnetic film is deteriorated. Hence, it is found that all values of $(\mu, \delta_b)$ that satisfy the relationship of $\mu \cdot \delta_b \geq 1000$ cannot be always used for practical design even if the relationship of a $\mu \cdot \delta_b \geq 1000$ was satisfied. It is necessary to satisfy the relationship of $v \cdot \delta_b \geq 1000$ and to satisfy simultaneously a relationship of $5 \leq \mu \leq 200$ and a relationship that $\delta_b$ was 500 nm or less.

On the other hand, a signal having a recording density of 300 kFRPI was recorded on the conventional mediums AB1 to AB4 and the conventional comparison mediums AC1 to AC6. Reproduced outputs were thereafter measured with a MR head. As shown in the first embodiment, the value of $\mu \cdot \delta_b = 1000$ is insufficient to obtain securely a recording/reproducing sensitivity but the value of $\mu \cdot \delta_b$ requires at least $\mu \cdot \delta_b = 2000$ or more. From this, a vertical two-layer medium which uses a $Fe_{84.9}Si_{9.6}Al_{5.5}$ film as its lower soft magnetic film can obtain more securely a recording/reproducing sensitivity than a vertical two-layer medium which uses a $Ni_{21.5}Fe_{78.5}$ film as its lower soft magnetic film, even if the value of $\mu\cdot\delta_b$ is small. In other words, the lower soft magnetic film can be designed to be thinner. This is because the $Fe_{84.9}Si_{9.6}Al_{5.5}$ film has smaller anisotropy and is more isotropic than the $Ni_{21.5}Fe_{78.5}$ film. Therefore, the $Fe_{84.9}Si_{9.6}Al_{5.5}$ film has a higher sensitivity to the magnetic field generated by the recording head, so that the recording/reproducing sensitivity is improved as a result.

From the above, if a $Fe_{84.9}Si_{9.6}Al_{5.5}$ film was used in place of a $Ni_{21.5}Fe_{78.5}$ film for a vertical two-layer medium, design can be made with a lower value of $\mu\cdot\delta_b$. If the relationship of a $\delta_b \geq 1000$ is satisfied and if relationships of $5 \leq \mu \leq 200$ and $\delta_b \leq 500$ nm are satisfied simultaneously where the magnetic permeability of the $Fe_{84.9}Si_{9.6}Al_{5.5}$ film was $\mu$ and the film thickness thereof was $\mu_b$, sufficient recording/reproducing sensitivity can be secured even in case where the vertical magnetic anisotropic energy Ku and the coercive force Hc in the direction vertical to the film surface are much greater than those of conventional vertical magnetization films, as in the eight embodiment. As a conclusion, by using a $Fe_{84.9}Si_{9.6}Al_{5.5}$ film as a lower soft magnetic film and by satisfying the conditions of $v\cdot\delta_b \geq 1000$, $5 \geq \mu \geq 200$, and $\delta_b \leq 500$ nm, the lower soft magnetic film can be made thinner than in the case of using a $Ni_{21.5}Fe_{78.5}$ film which is often used conventionally as a lower soft magnetic film, even if where the vertical magnetic anisotropic energy Ku and the coercive force Hc in the direction vertical to the film surface are much greater than those of conventional CoCr-based vertical magnetization films (e.g., Ku is about $5 \times 10^6$ [erg/cc] and Hc is about 3 [kOe]), as in the case of the material used in the present embodiment. Accordingly, it is possible to obtain a novel vertical two-layer medium in which the lower soft magnetic film can be made thinner and a process of manufacturing a medium can be made easier.

The Ninth Embodiment

In the same manner as in the first embodiment, samples were prepared in which $Co_{62}Ni_{12}Fe_{26}$ films were formed on substrates using 62wt %Co-12wt %Ni-26wt %Fe targets were used in place of 84.9wt %Fe-9.6wt %Si-5.5wt %Al targets used in the first embodiment. Like the first embodiment, total seventy different kinds of samples with $Co_{62}Ni_{12}Fe_{26}$ films were prepared. Also, like the first embodiment, mediums were prepared using $SmCo_{17}$ (at %) targets in place of the 50at %Fe-50at %Pt targets used in the first embodiment, on $Co_{62}Ni_{12}Fe_{26}$ films formed separately from those formed for the purpose of measurement of magnetic permeability.

At this time, like the first embodiment, mediums having $Co_{62}Ni_{12}Fe_{26}$ films having combinations of a permeability $\mu$ and a film thickness $\delta_b$ [nm] that satisfy $\mu\cdot\delta_b=1000$, e.g., ($\mu$, $\delta_b$)=(5, 200), (10, 100), (20, 50), (50, 20), (100, 10), and (200, 5) were respectively named vertical magnetic recording mediums J1 to J6 according to the ninth embodiment. In addition, mediums having $Co_{62}Ni_{12}Fe_{26}$ films having combinations of a permeability $\mu$ and a film thickness $\delta_b$ [nm] that satisfy $\mu\cdot\delta_b=500$, e.g., ($\mu$, $\delta_b$)=(5, 100), (10, 50), (50, 10), and (100, 5) were respectively named comparison mediums JJ1 to JJ4. Also, a medium having $Co_{62}Ni_{12}Fe_{26}$ films having combinations of a permeability $\mu$ and a film thickness $\delta_b$ [nm] that satisfies $\mu\cdot\delta_b=400$, e.g., ($\mu$, $\delta_b$)=(20, 20) was named a comparison medium JJ5. Further, mediums having $Co_{62}Ni_{12}Fe_{26}$ films each having permeabilities $\mu=2$ to 200 and a film thickness $\delta_b=750$ nm were respectively named comparison mediums JJ6 to JJ12.

Also, in the ninth embodiment, like the first embodiment, conventional mediums AB1 to AB4 as vertical two-layer mediums having $Ni_{21.5}Fe_{78.5}$ films as the lower soft magnetic films were formed to have a permeability $\mu$ and a film thickness $\delta_b$ [nm] that satisfy $\mu\cdot\delta_b=2000$, e.g., ($\mu$, $\delta_b$)=(10, 200), (20, 100), (100, 20), and (200, 10). Also, conventional comparison mediums AC1 to AC6 were formed to have a permeability $\mu$ and a film thickness $\delta_b$ [nm] satisfy $\mu\cdot\delta_b=1000$, e.g., ($\mu$, $\delta_b$)=(5, 200), (10, 100), (20, 50), (50, 20), (100, 10), and (200, 5).

Then, the vertical magnetic anisotropic energy Ku of each $Sm_2Co_{17}$ film was measured by a magnetic torque meter to find $Ku=7\times10^8$ [erg/cc]. In addition, the coercive force in the direction vertical to the film surface was measured by a Kerr rotation angle measurement device to find Hc=10.0 [kOe].

Recording/reproducing tests were made to total seventy kinds of vertical magnetic recording mediums having seven different permeabilities for every one of ten different film thicknesses of lower soft magnetic films, under the same conditions as those of the first embodiment. Specifically, a signal having a recording density of 300 kFRPI was recorded, and thereafter, a reproduced output thereof was measured. Table 10 shows the values of reproduced outputs. This table 10 also shows which values belong to which of the mediums according to the ninth embodiment and the comparison mediums.

TABLE 10

Reproduced outputs

| | $\mu$ | | | | | | |
|---|---|---|---|---|---|---|---|
| $\delta$ b | 2 | 5 | 10 | 20 | 50 | 100 | 200 |
| 2 nm | 137 | 136 | 154 | 172 | 195 | 194 | 223 |
| 5 nm | 160 | 176 | 167 | 162 | 198 | 217 | 439 |
| 10 nm | 162 | 174 | 213 | 229 | 232 | 437 | 444 |
| 20 nm | 148 | 193 | 194 | 206 | 463 | 432 | 447 |
| 50 nm | 144 | 211 | 237 | 464 | 465 | 439 | 460 |
| 100 nm | 170 | 262 | 474 | 487 | 464 | 449 | 452 |
| 200 nm | 204 | 498 | 486 | 501 | 479 | 485 | 483 |
| 250 nm | 220 | 479 | 497 | 504 | 515 | 523 | 512 |
| 500 nm | 257 | 480 | 486 | 517 | 510 | 539 | 554 |
| 750 nm | 248 | 292 | 327 | 316 | 297 | 322 | 303 |

Unit: $\mu$ V

*values of comparison mediums in solid line block
*values of mediums in the ninth embodiment in dotted line block As can be seen from the table 10, the reproduced outputs are sufficiently secured in the region lower than the mediums J1 to J6 of the present embodiment. On the other hand, reproduced outputs can be greatly lowered in the region upper than the comparison mediums JJ6 to JJ12. FIG. 4 also summarizes the results obtained above, in a different manner, where the horizontal axis expresses the magnetic permeability $\mu$ of the lower soft magnetic film and the vertical expresses the film thickness $\delta_b$ thereof. From FIG. 4, it is found that sufficient reproduced outputs can be secured where $\mu\cdot\delta_b \geq 1000$ is satisfied.

In case where the magnetic permeability $\mu$ of the lower soft magnetic film is two, sufficient reproduced outputs cannot be secured with respect to any of the film thicknesses $\delta_b$. In case where the film thickness $\delta_b$ is 2 nm, sufficient reproduced outputs cannot be secured with respect to any of the permeabilities $\mu$. This is because the permeability $\mu$ and the film thickness $\delta_b$ were lower than required. Further, the reproduced output tends to decrease even when the film thickness $\delta_b$ of the lower soft magnetic film exceeds 500 nm. This is because the surface smoothness of the lower soft magnetic film is disturbed since the film thickness $\delta_b$ of the lower soft magnetic film is thicker than required. Consequently, the vertical orientation of the vertical magnetization film formed thereon is deteriorated. Hence, it is found that all values of $(\mu, \delta_b)$ that satisfy the relationship of $\mu \cdot \delta_b \geq 1000$ cannot be always used for practical design even if the relationship of $\mu \cdot \delta_b \geq 1000$ is satisfied. But, it is necessary to satisfy the relationship of $\mu \cdot \delta_b \geq 1000$ and to satisfy simultaneously a relationship of $5 \leq \mu \leq 200$ and a relationship that $\delta_b$ was 500 nm or less.

On the other hand, a signal having a recording density of 300 kFRPI was recorded on the conventional mediums AB1 to AB4 and the conventional comparison mediums AC1 to AC6. Reproduced outputs were thereafter measured with a MR head. As shown in the first embodiment, the value of $\mu \cdot \delta_b = 1000$ is insufficient to obtain securely a recording/reproducing sensitivity but the value of $\mu \cdot \delta_b$ requires at least $\mu \cdot \delta_b = 2000$ or more. From this, a vertical two-layer medium which uses a $Co_{62}Ni_{12}Fe_{26}$ film as its lower soft magnetic film can obtain more securely a recording/reproducing sensitivity than a vertical two-layer medium which uses a $Ni_{21.5}Fe_{78.5}$ film as its lower soft magnetic film, even if the value of $\mu \cdot \delta_b$ is small. In other words, the lower soft magnetic film can be designed to be thinner. This is because the $Co_{62}Ni_{12}Fe_{26}$ film has greater saturation magnetization than the $Ni_{21.5}Fe_{78.5}$ film. Therefore, the $Co_{62}Ni_{12}Fe_{26}$ film has a higher sensitivity to the magnetic field generated by the recording head, so that the recording/reproducing sensitivity is improved as a result.

From the above, if a $Co_{62}Ni_{12}Fe_{26}$ film was used in place of a $Ni_{21.5}Fe_{78.5}$ film for a vertical two-layer medium, design can be made with a lower value of $\mu \cdot \delta_b$. If the relationship of $\mu \cdot \delta_b \geq 1000$ is satisfied and if relationships of $5 \leq v \leq 200$ and $\delta_b \leq 500$ nm are satisfied simultaneously where the magnetic permeability of the $Co_{62}Ni_{12}Fe_{26}$ film is $\mu$ and the film thickness thereof is $\delta_b$, sufficient recording/reproducing sensitivity can be secured even in case where the vertical magnetic anisotropic energy Ku and the coercive force Hc in the direction vertical to the film surface are much greater than those of conventional vertical magnetization films, as in the present embodiment. As a conclusion, by using a $Co_{62}Ni_{12}Fe_{26}$ film as a lower soft magnetic film and by satisfying the conditions of $\mu \cdot \delta_b \geq 1000$, $5 \leq \mu \leq 200$, and $\delta_b \leq 500$ nm, the lower soft magnetic film can be more thinned than in the case of using a $Ni_{21.5}Fe_{78.5}$ film which is often used conventionally as a lower soft magnetic film, even if where the vertical magnetic anisotropic energy Ku and the coercive force Hc in the direction vertical to the film surface are much greater than those of conventional CoCr-based vertical magnetization films (e.g., Ku is about $5 \times 10^6$ [erg/cc] and Hc is about 3 [kOe]), as in the case of the material used in the present embodiment. Accordingly, it is possible to obtain a novel vertical two-layer medium which enables thinning of the lower soft magnetic film and easier process of manufacturing a medium.

From the results of the above first to ninth embodiments, it is apparent that the same advantages as obtained in the first to ninth embodiments can be obtained regardless of the material of the vertical magnetization film, if the vertical magnetic anisotropic energy of the vertical magnetization film falls within the range of $1 \times 10^7$ [erg/cc] $\leq Ku \leq 7 \times 10^8$ [erg/cc] and if the coercive force in the direction vertical to the film surface of the vertical magnetization film falls within the range of 5 [kOe] $\leq Hc \leq 10$ [kOe].

Although embodiments of the present invention have been described above on the basis of the drawings, specific structures of the present invention were not limited to those described in the above embodiments but may be variously modified without deviating from the subject of the present invention.

As has been described above, according to the present invention, a vertical magnetic recording medium was composed of layering a lower soft magnetic film and a vertical magnetization film on a substrate made of a non-magnetic material. Here, the lower soft magnetic film is arranged to satisfy a relationship of $\mu \cdot \delta_b \geq =1000$ where $\mu$ is the magnetic permeability of the lower soft magnetic film and $\delta_b$ is the film thickness thereof. Therefore, even if FePt alloy or RCo alloy (where R=Y, Ce, Sm, La, Pr) as a vertical magnetization film has much greater vertical magnetic anisotropic energy Ku and a much greater coercive force Hc in the direction vertical to the film surface than those of a CoCr-based vertical magnetization film which is often used conventionally and generally, the lower soft magnetic film can be more thinned than in the case of using a $Ni_{21.5}Fe_{78.5}$ film which is often used as the lower soft magnetic film. Accordingly, it is possible to realize a easy process for preparing a medium and to obtain a novel vertical two-layer medium.

What is claimed is:

1. A vertical magnetic recording medium comprising:

a soft magnetic film formed on a substrate; and a vertical magnetization film formed on said soft magnetic film, wherein $\mu \cdot \delta b \geq 1000$ where $\mu$ is a permeability of said soft magnetic film, and $\delta b$ is a film thickness of said soft magnetic film, and wherein vertical magnetic anisotropy energy Ku of said vertical magnetization film is $1 \times 10^7 \leq Ku \leq 7 \times 10^8$.

2. A vertical magnetic recording medium comprising:

a soft magnetic film formed on a substrate; and a vertical magnetization film formed on said soft magnetic film, wherein $\mu \cdot \delta b \geq 1000$ where $\mu$ is a permeability of said soft magnetic film, and $\delta b$ is a film thickness of said soft magnetic film, and wherein coercive force Hc of said vertical magnetization film in the vertical direction to a surface of said vertical magnetization film is $5 \leq Hc \leq 10$.

3. A vertical magnetic recording medium comprising:

a soft magnetic film formed on a substrate; and a vertical magnetization film formed on said soft magnetic film, wherein $\mu \cdot \delta b \geq 1000$ where $\mu$ is a permeability of said soft magnetic film, and $\delta b$ is a film thickness of said soft magnetic film, and wherein said vertical magnetization film comprises RCo alloy, where R is one or more selected from the group consisting of Y, Ce, Sm, La and Pr.

4. The vertical magnetic recording medium according to claim 3, wherein said vertical magnetization film comprises $RCo_5$ alloy, where R is one or more selected from the group consisting of Y, Ce and Sm.

5. The vertical magnetic recording medium according to claim 3, wherein said vertical magnetization film comprises $R_2Co_{17}$ alloy, where R is one or more selected from the group consisting of Y, Ce, Sm, La and Pr.

6. A vertical magnetic recording medium comprising:

a soft magnetic film formed on a substrate; and a vertical magnetization film formed on said soft magnetic film, wherein $\mu \cdot \delta b \geq 1000$, where $\mu$ is a permeability of said soft magnetic film, and $\delta b$ is a film thickness of said soft magnetic film, wherein said soft magnetic film comprises CoNiFe alloy, and wherein said soft magnetic film comprises 62at %Co-12at %Ni-26at %Fe alloy.

7. A vertical magnetic recording medium comprising:

a soft magnetic film formed on a substrate; and a vertical magnetization film formed on said soft magnetic film, wherein $\mu \cdot \delta b \geq 1000$ where $\mu$ is a permeability of said soft magnetic film, and $\delta b$ is a film thickness of said soft magnetic film, said permeability $\mu$ of said soft magnetic film is $5 \leq \mu \leq 200$, said film thickness $\delta b$ of said soft magnetic film is equal to or less than 500 nm, and wherein said vertical magnetization film comprises RCo alloy, where R is one or more selected from the group consisting of Y, Ce, Sm, La and Pr.

8. A vertical magnetic recording medium comprising:

a soft magnetic film formed on a substrate; and a vertical magnetization film formed on said soft magnetic film, wherein $\mu \cdot \delta b \geq 1000$ where $\mu$ is a permeability of said soft magnetic film, and $\delta b$ is a film thickness of said soft magnetic film, said permeability $\mu$ of said soft magnetic film is $5 \leq \mu \leq 200$, said film thickness $\delta b$ of said soft magnetic film is equal to or less than 500 nm, and wherein vertical magnetic anisotropy energy Ku of said vertical magnetization film is $1 \times 10^7 \leq Ku \leq 7 \times 10^8$.

9. A vertical magnetic recording medium comprising:

a soft magnetic film formed on a substrate; and a vertical magnetization film formed on said soft magnetic film, wherein $\mu \cdot \delta b \geq 1000$ where $\mu$ is a permeability of said soft magnetic film, and $\delta b$ is a film thickness of said soft magnetic film, said permeability $\mu$ of said soft magnetic film is $5 \leq \mu \leq 200$, said film thickness $\delta b$ of said soft magnetic film is equal to or less than 500 nm, and wherein coercive force Hc of said vertical magnetization film in the vertical direction to a surface of said vertical magnetization film is $5 \leq Hc \leq 10$.

* * * * *